(12) United States Patent
Hirai et al.

(10) Patent No.: US 9,042,637 B2
(45) Date of Patent: May 26, 2015

(54) IMAGE PROCESSING DEVICE, METHOD OF PROCESSING IMAGE, AND IMAGE DISPLAY APPARATUS

(75) Inventors: Ryusuke Hirai, Tokyo (JP); Takeshi Mita, Kanagawa (JP); Kenichi Shimoyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 13/360,062

(22) Filed: Jan. 27, 2012

(65) Prior Publication Data

US 2013/0121560 A1   May 16, 2013

(30) Foreign Application Priority Data

Nov. 14, 2011   (JP) ................................ 2011-249164

(51) Int. Cl.
*G06K 9/00* (2006.01)
*G06T 7/20* (2006.01)
*G06T 7/00* (2006.01)

(52) U.S. Cl.
CPC .............. *G06K 9/00* (2013.01); *G06K 9/00261* (2013.01); *G06T 7/2086* (2013.01); *G06T 7/004* (2013.01); *G06T 2207/10012* (2013.01); *G06T 2207/10016* (2013.01); *G06T 2207/30201* (2013.01)

(58) Field of Classification Search
CPC .................. G06T 7/0075; G06T 2207/10012; G06T 2207/10016; G06T 7/2033; H04N 13/0239; G06K 9/3241
USPC .................................................. 382/154, 103
See application file for complete search history.

(56) References Cited

U.S. PATENT DOCUMENTS

2005/0207486 A1   9/2005   Lee et al.
2012/0133754 A1*  5/2012   Lee et al. ......................... 348/78

FOREIGN PATENT DOCUMENTS

JP   2007-529960   10/2007
JP   2008-26974    2/2008
JP   2011-90465    5/2011

OTHER PUBLICATIONS

Kobayashi et al: "3D Head Tracking using the Particle Filter with Cascaded Classifiers", BMVC, 2006.*
Nakao, JP2011-090465-Eng, the machin made English translation for JP2011-090465, May 6, 2011.*

(Continued)

*Primary Examiner* — Ruiping Li
(74) *Attorney, Agent, or Firm* — Finnegan, Henderson, Farabow, Garrett & Dunner, L.L.P.

(57) ABSTRACT

According to an embodiment, an image processing device includes: a first acquiring unit, a second acquiring unit, a first setting unit, a second setting unit, a first calculating unit, and a second calculating unit. The first acquiring unit acquires a plurality of captured images by imaging a target object from a plurality of positions. The second acquiring unit acquires a provisional three-dimensional position and a provisional size. The first setting unit sets at least one search candidate point near the provisional three-dimensional position. The second setting unit sets a search window for each projection position where the search candidate point is projected, the search window having a size. The first calculating unit calculates an evaluation value that represents whether or not the target object is included inside the search window. The second calculating unit calculates a three-dimensional position of the target object based on the evaluation value.

11 Claims, 14 Drawing Sheets

(56) References Cited

OTHER PUBLICATIONS

Viola, P. et al., "Rapid Objects Detection using a Boosted Cascade of Simple Features," IEEE Conf. on Computer Vision and Pattern Recognition, pp. 1-9, (2001).

Kobayashi, Y. et al., "3D Head Tracking using the Particle Filter with Cascaded Classifiers," MIRU2006, pp. 222-228, (2006).

Notice of Rejection issued by the Japanese Patent Office on Oct. 7, 2014, for Japanese Patent Application No. 2011-249164, and English-language translation thereof.

* cited by examiner

FIG.13
1300(A)
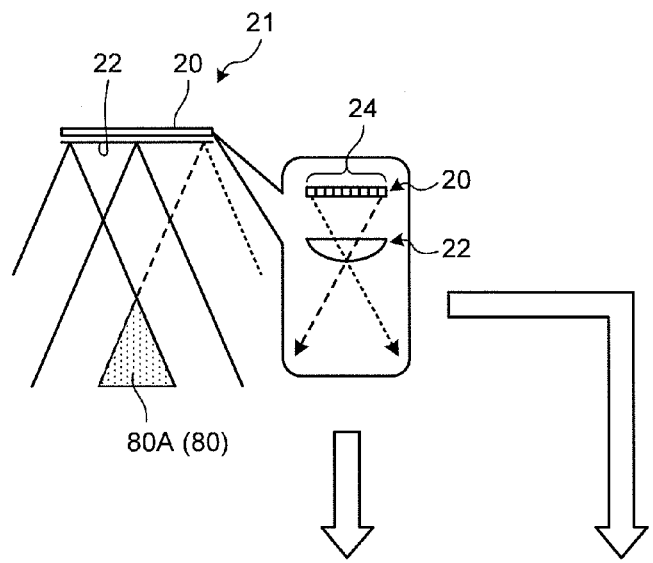
1300(B)
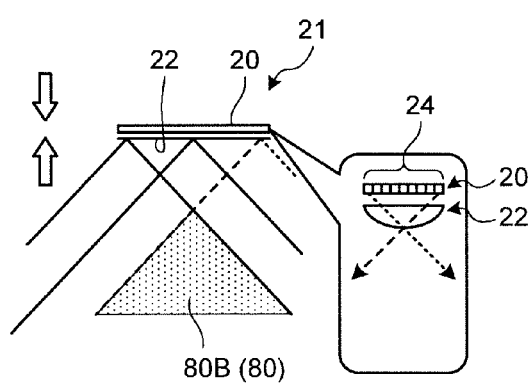
1300(C)
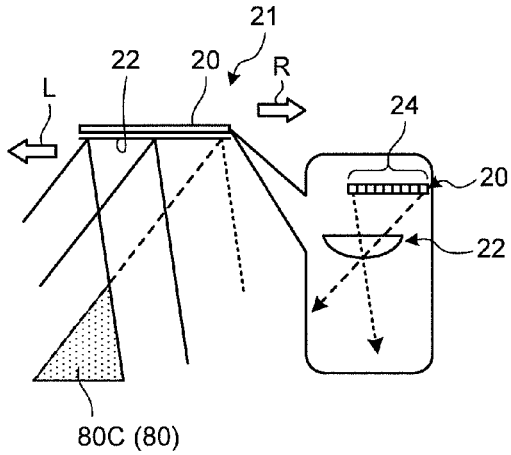

IMAGE PROCESSING DEVICE, METHOD OF PROCESSING IMAGE, AND IMAGE DISPLAY APPARATUS

CROSS-REFERENCE TO RELATED APPLICATIONS

This application is based upon and claims the benefit of priority from Japanese Patent Application No. 2011-249164, filed on Nov. 14, 2011; the entire contents of which are incorporated herein by reference.

FIELD

Embodiments described herein relate generally to an image processing device, a method of processing an image, and an image display apparatus.

BACKGROUND

As a method of detecting a position of a target object in a captured image and estimating the three-dimensional position of the target object based on the detected position, a technique using a particle filter is known. In the particle filter, a tracking target object is expressed as a discrete probability density by a plurality of provisional groups each having the quantity of state and a likelihood. Then, by propagating the tracking target object by using a state transition model, a tracking process is performed in which the effect of a variation in the motion or of a noise is suppressed.

In the method using the particle filter, three-dimensional coordinates of a local feature are calculated based on a stereo image, and three-dimensional coordinate sample points forming a provisional group are set in a vicinity of the three-dimensional coordinates. Then, by evaluating two-dimensional coordinate sample points acquired by projecting the three-dimensional coordinate sample points on the stereo image as the provisional group, the three-dimensional position of the local feature is estimated.

In addition, a method is also disclosed in which a head of a person is assumed as an ellipsoid model having a predetermined size by using a particle filter that generates three-dimensional sample points at three-dimensional positions as a provisional group. In the disclosure, the size acquired by projecting the ellipsoid onto each captured image is set as the size of a search window, and the likelihood that represents a probability of the existence of the head of a person within the search window is calculated as a provisional likelihood. Then, the three-dimensional position of the head of the person is estimated based on the provisional likelihood. Furthermore, a search method using a search window is known.

However, according to the method that uses only the particle filter, it is difficult to acquire the size of a search window, and it is difficult to apply a search method. In addition, according to a method that uses an ellipsoid model, since the size of the search window is determined based on a specific person, it is difficult to absorb an individual difference of a target object.

BRIEF DESCRIPTION OF THE DRAWINGS

FIG. 13 is a diagram illustrating control on a set position and a set range of a vision according to a third embodiment;

DETAILED DESCRIPTION

According to an embodiment, an image processing device includes: a first acquiring unit, a second acquiring unit, a first setting unit, a second setting unit, a first calculating unit, and a second calculating unit. The first acquiring unit configured to acquire a plurality of captured images by imaging a target object from a plurality of positions. The second acquiring unit configured to acquire a provisional three-dimensional position of the target object and a provisional size of the target object. The first setting unit configured to set at least one search candidate point in a vicinity of the provisional three-dimensional position. The second setting unit configured to set a search window used to search the target object for each projection position at which the search candidate point is projected on each captured image, the search window having a size that is based on the position of the search candidate point and the provisional size. The first calculating unit configured to calculate an evaluation value that represents whether or not the target object is included inside the search window. The second calculating unit configured to calculate a three-dimensional position of the target object based on the evaluation value.

First Embodiment

An image processing device according to this embodiment is used in an image display apparatus such as a television (TV), a personal computer (PC), a smart phone, or a digital photo frame that enables a viewer to observe a stereoscopic image with unaided eyes. A stereoscopic image is an image that includes a plurality of parallax images having parallax therebetween. Here, an image described in embodiments may be either a still image or a moving image.

Figure 1:
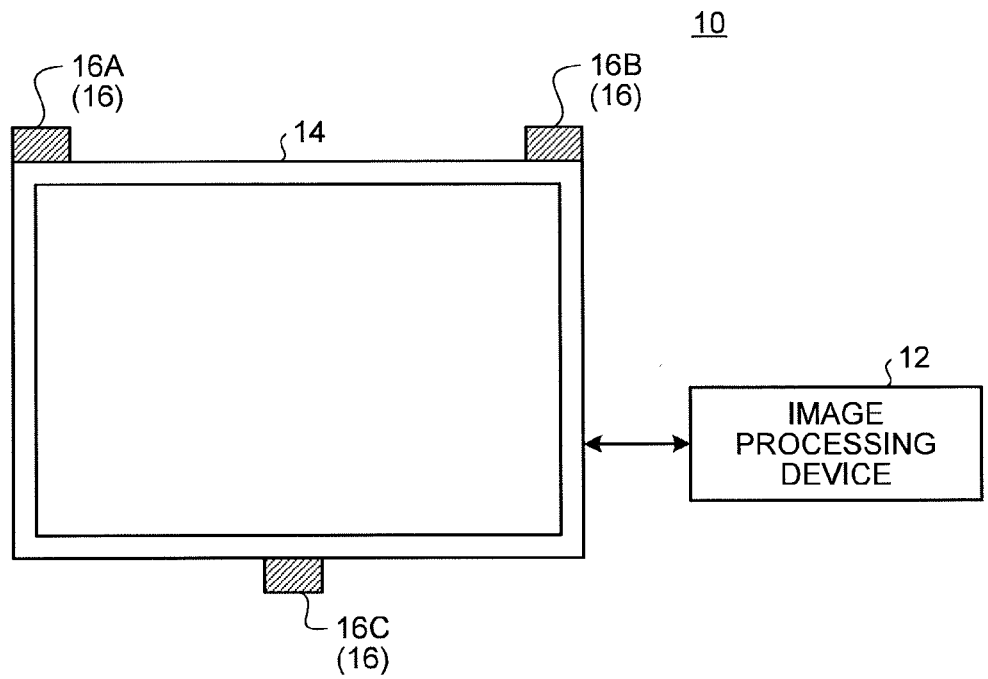
FIG. 1 is a diagram of an image display apparatus according to a first embodiment.

FIG. 1 is a schematic diagram of an image display apparatus 10 according to this embodiment. The image display apparatus 10 includes a display device 14, an imaging device 16, and an image processing device 12.

Figure 2:
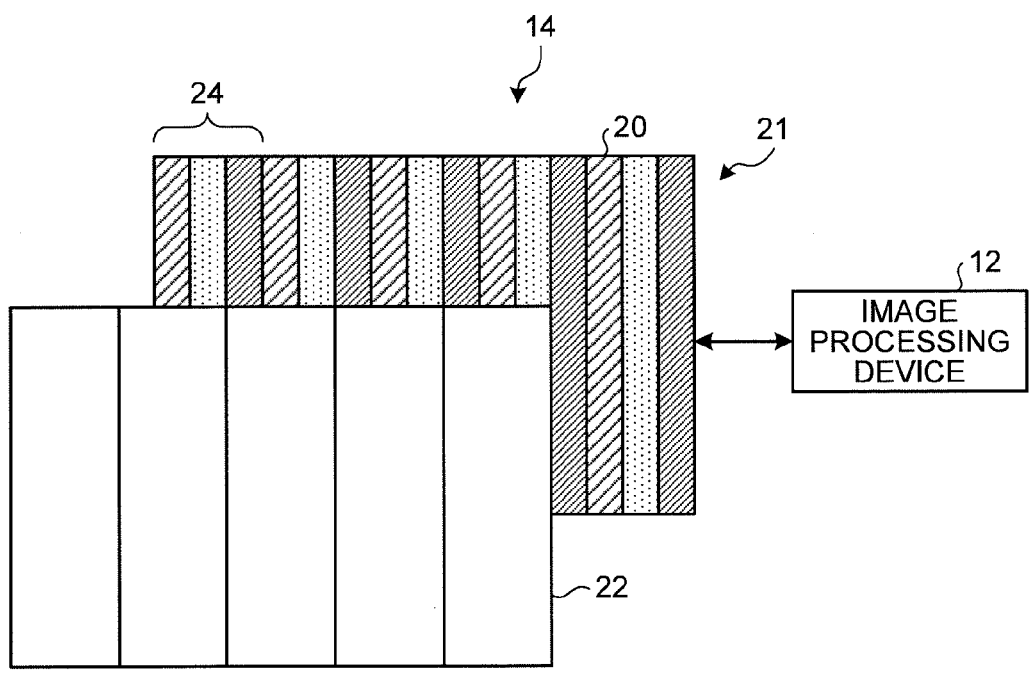
FIG. 2 is a diagram of a display device according to the first embodiment.

FIG. 2 is a schematic diagram of the display device 14. As illustrated in FIG. 2, the display device 14 includes a displaying unit 21 that displays a stereoscopic image. A stereoscopic image is an image that includes a plurality of parallax images having parallax therebetween. The displaying unit 21 employs, for example, a 3D display system such as an integral imaging system (system II) or a multiple viewpoint system.

The displaying unit 21 includes a display panel 20 and a light beam controlling unit 22. The display panel 20 is a liquid crystal panel in which a plurality of sub pixels (for example, R, G, and B) having color components are arranged in a first direction (for example, a row direction (horizontal) in FIG. 1) and a second direction (for example, a column direction (vertical) in FIG. 1) to be a matrix pattern. In this case, sub pixels of colors R, G, and B aligned in the first direction form one pixel. Here, an image displayed by a pixel group in which adjacent pixels corresponding to the number of parallaxes arranged in the first direction will be referred to as an element image 24. The sub pixels of the display device 14 may be arranged according to another known way of arrangement. In addition, the colors of the sub pixels are not limited to three colors R, G, and B. For example, the number of the colors of the sub pixels may be four or more.

In the display panel 20, a two-dimensional display of a direct-viewing type such as an organic electroluminescence (EL), a liquid crystal display (LCD), or a plasma display panel (PDP) is used. Alternatively, a display of a projection type may be used. In addition, the display panel 20 may have a configuration that includes a back light.

The light beam controlling unit 22 is arranged to face the display panel 20 with a gap interposed therebetween. The light beam controlling unit 22 controls output directions of light beams emitted from the sub pixels of the display panel 20. In the light beam controlling unit 22, an optical aperture used for outputting a light beam extend in a straight line, and a plurality of the optical apertures are arranged in the first direction. The light beam controlling unit 22 uses, for example, a lenticular sheet in which a plurality of cylindrical lenses are arranged, or a parallax barrier in which a plurality of slits are arranged. The optical apertures are arranged in correspondence with the element images 24 of the display panel 20.

Figure 3:
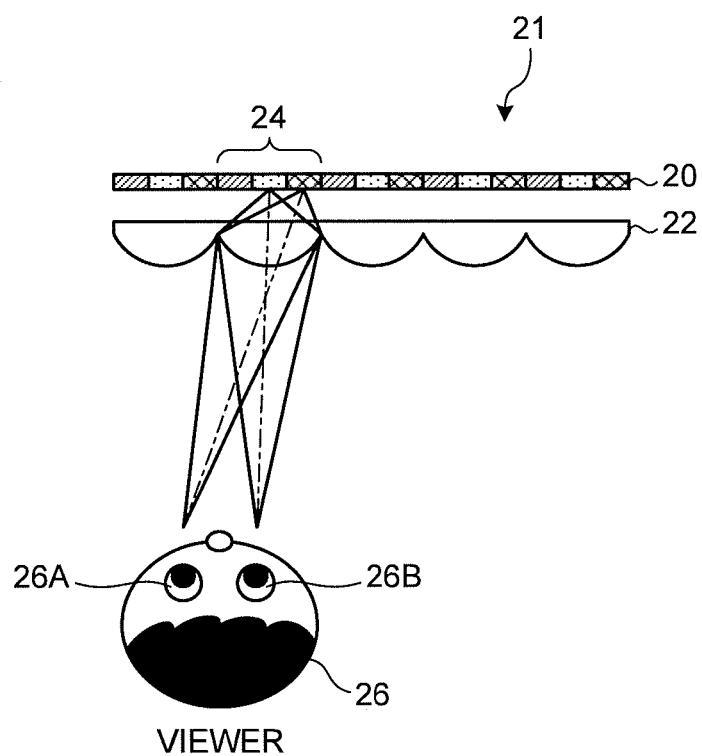
FIG. 3 is a schematic diagram of a displaying unit according to the first embodiment.

FIG. 3 is a schematic diagram illustrating a state in which the displaying unit 21 is visually recognized by a viewer. On the display panel 20, a plurality of the element images 24 are displayed. Then, a parallax image group (multiple-parallax images) corresponding to a plurality of parallax directions is displayed on the display panel 20. The light beams corresponding to the multiple parallax images pass through the optical apertures of the light beam controlling unit 22. Then, a viewer 26 located within a vision area observes different pixels included in the element image 24 by a left eye 26A and a right eye 26B. In this way, images having different parallax for the left eye 26A and the right eye 26B of the viewer 26 are displayed so that the viewer 26 can observe a stereoscopic image.

Referring back to FIG. 1, the imaging device 16 images a target object located in a real space. The target object is an object of which the three-dimensional position and the size are calculated by using the image processing device 12 to be described later.

As the imaging device 16, a known imaging device is used. In this embodiment, the image display apparatus 10 includes a plurality of the imaging devices 16. The imaging devices 16 are located at different positions. In this embodiment, for example, an imaging device 16A is installed at one end portion of the displaying unit 21 in the horizontal direction, and an imaging device 16B is installed at the other end portion of the displaying unit 21 in the horizontal direction. In addition, an imaging device 16C is installed at a center portion of the displaying unit 21 in the horizontal direction. However, the installation positions of the imaging devices 16A to 16C are not limited to such positions. In addition, the number of the imaging devices 16 included in the image display apparatus 10 may be two or more and is not limited to three. In this embodiment, when the imaging devices 16A to 16C are collectively described, they will be simply referred to as imaging devices 16 in the description.

The image processing device 12 calculates the three-dimensional position and the size of a target object in a real space. In this embodiment, a three-dimensional position represents three-dimensional position coordinates in the real space. On the other hand, a two-dimensional position to be described later represents two-dimensional position coordinates.

Figure 4:
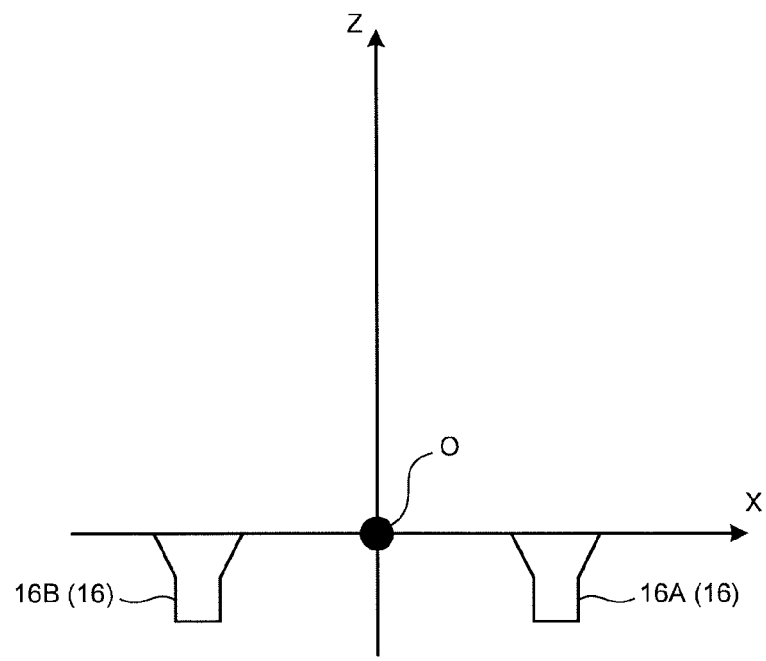
FIG. 4 is a diagram illustrating a three-dimensional coordinate system according to the first embodiment.

In this embodiment, the three-dimensional coordinate system in the real space is defined as follows. FIG. 4 is a schematic diagram illustrating the three-dimensional coordinate system according to this embodiment. As illustrated in FIG. 4, in this embodiment, the position of the center of gravity of the positions of the plurality of imaging devices 16 installed in the image display apparatus 10 in the real space is set as the origin O. In addition, the horizontal direction passing through the origin O is set as X axis. Furthermore, a direction that passes through the origin O and sets the imaging direction of the imaging device 16 as being positive is set as Z axis. In addition, a direction that is perpendicular to the XZ plane, passes through the origin O, and sets a direction opposite to the direction of gravitational force of the imaging devices 16 as being positive is set as Y axis. In this embodiment, a coordinate system that is defined by the X axis, the Z axis, and the Y axis is described as the three-dimensional coordinate system in the real space. However, the method of setting the coordinates in the real space is not limited thereto. In addition, the upper left side of a captured image may be set as the origin, the x axis may be set such that the x axis sets the horizontal right side as being positive, and the y axis may be set such that the y axis sets the vertical lower side as being positive.

In addition, in the image processing device 12, a provisional three-dimensional position, a provisional size, the three-dimensional position and the size of the target object are calculated by using a search method. The three-dimensional position of a target object represents the actual position of the target object in the real space. The size of a target object represents the actual size of the target object. The provisional three-dimensional position of a target object is a provisional position of the target object acquired by using a method different from a method of calculating the three-dimensional position to be described later. The provisional size of a target object is a provisional size of the target object acquired by using a method different from a method of calculating the size to be described later. In addition, the methods of calculating the provisional three-dimensional position, the provisional size, the three-dimensional position, and the size of the target object are described later in detail.

In this embodiment, it is assumed that the target object is a person's front face, and the captured image of the target object is a facial image acquired by imaging the person's face from the front side. In such a case, as the search method, a search method is used which is disclosed in Paul Viola and Michael Jones, "Rapid Object Detection using a Boosted Cascade of Simple Features" IEEE conf. on Computer Vision and Pattern Recognition (CVPR 2001).

This search method is a method in which several rectangular features are acquired for an image located inside the search window, and it is determined whether or not the image is a front face by a strong classifier acquired by connecting in series weak classifiers for the features.

In a case where the search method is used by the image processing device 12, each functioning unit (to be described in detail later) may be configured to include a pattern classifier (not illustrated in the figure). The pattern classifier is a classifier having a cascade structure in which a plurality of weak classifiers are connected in series and it is a cascade-type AdaBoost-based classifier disclosed in Paul Viola and Michael Jones, "Rapid Object Detection using a Boosted Cascade of Simple Features" IEEE conf. on Computer Vision and Pattern Recognition (CVPR 2001).

Specifically, the pattern classifier determines whether an input captured image is a face or not a face using the weak classifiers of each stage of the cascade and performs a next determination for only images determined to be a face with the weak classifier of the next stage. Then, an image that has passed the last weak classifier is finally determined as a facial image.

The strong classifier forming each stage of the cascade has a configuration in which a plurality of weak classifiers are connected in series. Each weak classifier evaluates an image located inside a search window by using the acquired rectangular features.

Here, when x is set as a two-dimensional coordinate position vector within an image of the search window, the output of a weak classifier n in a position vector x is represented by the following Equation (1).

$$h_n(x) = \begin{cases} 1 & \text{if } p_n f_n(x) < p_n \theta_n \\ -1 & \text{otherwise} \end{cases} \quad (1)$$

In Equation (1), $h_n(x)$ represents an output of a weak classifier n, and $f_n(x)$ represents a determination function of the weak classifier n. In addition, in Equation (1), $p_n$ is a number of 1 or −1 that determines a direction of an inequality sign, and $\theta_n$ represents a threshold value that is predetermined for each weak classifier n. For example, the threshold value $\theta_n$ is set in a learning process at the time of generating the classifier.

In addition, an output of the strong classifier having a configuration in which N weak classifiers are connected in series is represented by the following Equation (2).

$$H(x) = \sum_{n=1}^{N} \alpha_n h_n(x) \quad (2)$$

In Equation (2), H(x) represents the output of the strong classifier having the configuration in which N weak classifiers are connected in series. In addition, in Equation (2), $\alpha_n$ represents a weighting factor of the weak classifier n that is determined in advance, and $h_n$ represents the output of the weak classifier n represented in Equation (1). For example, the weighting factor $\alpha_n$ is set in a learning process at the time of generating the classifier.

In addition, in order to calculate the likelihood l(x) that represents the likelihood of a face for the image that has passed the pattern classifier, the following Equation (3) is used.

$$l(x) = \frac{1}{1 + \exp(-aH(x))} \quad (3)$$

In Equation (3), a is an integer that represents a weighting factor generated in a learning process at the time of generating the classifier. In addition, in Equation (3), H(x) represents the output of the strong classifier.

A target object is not necessarily imaged in a fixed direction. For example, a case may be also considered in which the target object is imaged in a horizontal direction or an inclined direction. In such a case, the image processing device 12 is configured to include a pattern classifier used for detecting a side face. In addition, each functioning unit of the image processing device 12 that uses a search method is configured to include pattern classifiers corresponding to one or a plurality of postures of the target object.

Figure 5:
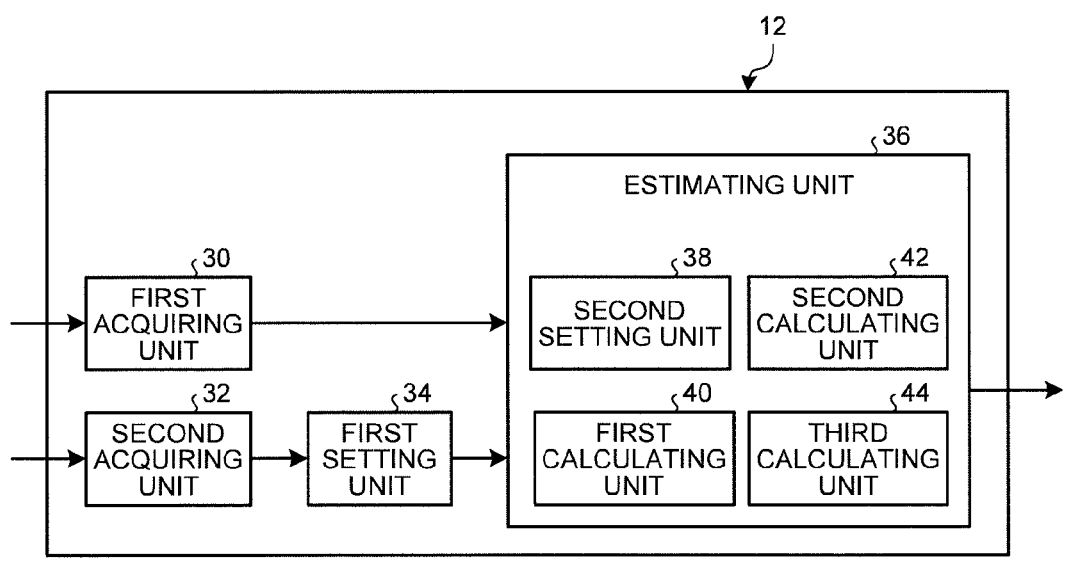
FIG. 5 is diagram of an image processing device according to the first embodiment.

Next, the image processing device 12 is described in detail. FIG. 5 is block diagram illustrating a functional configuration of the image processing device 12.

As illustrated in FIG. 5, the image processing device 12 includes a first acquiring unit 30, a second acquiring unit 32, a first setting unit 34, and an estimating unit 36.

The first acquiring unit 30 acquires captured images of a target object from the plurality of the imaging devices 16. The first acquiring unit 30 outputs the plurality of the captured images that have been acquired to the estimating unit 36.

The second acquiring unit 32 acquires a provisional three-dimensional position that represents the provisional three-dimensional coordinates of the target object in the real space and a provisional size that is the provisional size of the target object in the real space.

The methods of acquiring the provisional three-dimensional position of the target object and the provisional size of the target object by using the second acquiring unit 32 may be known methods for acquiring the three-dimensional position and the size of the target object.

For example, the second acquiring unit 32 acquires the provisional three-dimensional position of the target object and the provisional size of the target object by using the captured image captured by the imaging device 16 through a search method.

For example, the second acquiring unit 32 acquires the provisional three-dimensional position and the provisional size of the target object by using a captured image captured by a stereo camera. In addition, in this embodiment, a case will be described in which the captured image of the imaging device 16A and the captured image of the imaging device 16B, which are installed at both end portions of the displaying unit 21 in the horizontal direction, are used as the captured images captured by the stereo camera. For convenience of the description, the imaging device 16A will be referred to as a main camera, and the imaging device 16B will be referred to as a sub camera in the description. However, the method of selecting the main camera and the sub camera is arbitrary and is not limited to that described above.

Figure 6:
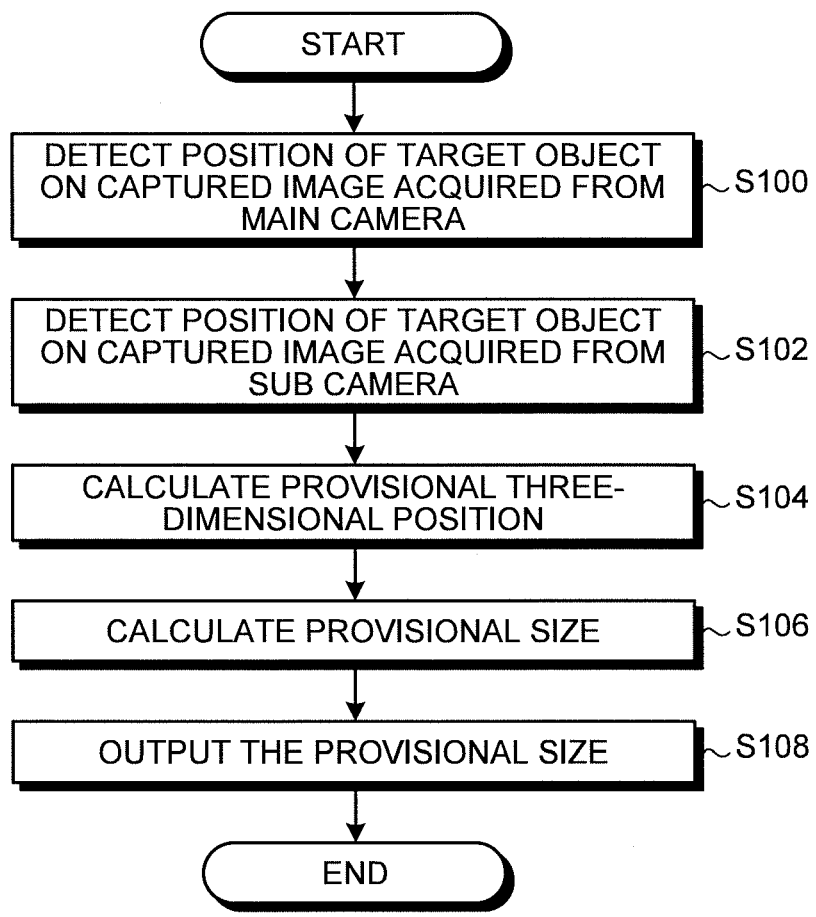
FIG. 6 is a flowchart of an acquisition process according to the first embodiment.

FIG. 6 is a flowchart illustrating an example of the sequence of the process of acquiring the provisional three-dimensional position and the provisional size of a target object, which is performed by the second acquiring unit 32.

The second acquiring unit 32, first, detects the position of a target object on a captured image from the captured image acquired from the imaging device 16A as a main camera in Step S100. In the detection of the position of the target object, the above-described search method is used. Described in detail, the second acquiring unit 32 is configured to include the above-described pattern classifier. Then, the second acquiring unit 32 determines whether or not an image located inside the search window having a specific search window size, which is included in the captured image acquired from the imaging device 16A, is an image including a target object by using the pattern classifier. This search window size may be a size that is set in advance. In addition, this search window size may be stored in the second acquiring unit 32 in advance. Then, the second acquiring unit 32 scans the search window over all the images within the captured image acquired from the imaging device 16A and acquires a determination result for each scanned position. In addition, the second acquiring unit 32 performs the scanning by using search windows having a plurality of search window sizes different from one another. Furthermore, the plurality of search window sizes different from one another may be set in advance and stored in the second acquiring unit 32.

Then, the second acquiring unit 32 acquires the likelihood l(x) for each search window size and each scanning position vector x based on the output value H(x) of the strong classifier that is a determination result for each scanning position vector x scanned using each search window size within the captured image acquired from the imaging device 16A. The output value H(x) of the strong classifier and the likelihood l(x) for each search window size and each scanning position vector x are calculated by using Equation (2) and Equation (3) represented above. In addition, the second acquiring unit 32 detects the center position of the search window, which has the search window size, of the scanning position vector x having the highest likelihood l(x) as the position of the target object on the captured image acquired from the imaging device 16A, that is, two-dimensional position coordinates.

Next, the second acquiring unit 32 detects the position of a target object on a captured image based on the captured image acquired from the imaging device 16B as a sub camera in Step S102. In the detection, the above-described search method is used. In other words, similarly to the process of Step S100 except for using the captured image acquired from the imaging device 16B, the position of the target object on the captured image is detected.

In addition, the scanning of the captured image through the search window in Step S102 is not limited to the scanning of the entire captured image. For example, in the captured image of the sub camera, a target object is assumed to be imaged in an epipolar line shape in which a straight line joining the main camera (imaging device 16A) and the target object is projected on the captured image of the sub camera (imaging device 16B). In such a case, the scanning range of the search window in Step S102 described above may be only on the epipolar line.

Next, the second acquiring unit 32 calculates the provisional three-dimensional position of the target object in Step S104.

In Step S104, the second acquiring unit 32 calculates the provisional three-dimensional position of the target object by triangulation that is based on a two-dimensional position that is the position of the target object i on the captured image acquired from the main camera (imaging device 16A) and a two-dimensional position that is the position of the target object i on the captured image acquired from the sub camera (imaging device 16B).

In addition, the provisional three-dimensional position of the target object i is represented in the following Equation (4).

$$[\tilde{X}_i \tilde{Y}_i \tilde{Z}_i] \qquad (4)$$

The position vector $u_{i,l}$ of the target object i on the captured image acquired from the main camera (imaging device 16A) is represented in the following Equation (5). In addition, the position vector $u_{i,r}$ of the target object i on the captured image acquired from the sub camera (imaging device 16B) is represented in the following Equation (6). Then, the position coordinates of the target object i in the real space are represented in a homogenous coordinate system as in the following Equation (7). Then, the relation equations of the following Equations (8) and (9) can be acquired.

$$u_{i,l} = [x_l y_l 1]^T \qquad (5)$$

$$u_{i,r} = [x_r y_r 1]^T \qquad (6)$$

$$\tilde{U} = [\tilde{X}_i \tilde{Y}_i \tilde{Z}_i 1]^T \qquad (7)$$

$$\alpha u_{i,l} = P\tilde{U}_i \qquad (8)$$

$$\beta u_{i,r} = Q\tilde{U}_i \qquad (9)$$

In Equations (5) to (7), T represents transposition. In Equation (5), $x_l$ represents the x coordinate value of the two-dimensional coordinates of the target object i in the captured image of the main camera (imaging device 16A). In addition, in Equation (5), $y_l$ represents the y coordinate value of the two-dimensional coordinates of the target objet i in the captured image of the main camera (imaging device 16A).

In Equation (6), $x_r$ represents the x coordinate value of the two-dimensional coordinates of the target object i in the captured image of the sub camera (imaging device 16B). In addition, in Equation (6), $y_r$ represents the y coordinate value of the two-dimensional coordinates of the target objet i in the captured image of the sub camera (imaging device 16B).

In Equation (8), α represents the camera scale of the main camera (imaging device 16A) at the time of performing an imaging process. In Equation (9), β represents the camera scale of the sub camera (imaging device 16B) at the time of performing an imaging process. In addition, in Equation (8), P represents a projection matrix that is projected into the captured image of the main camera (imaging device 16A) from a point in the real space (three-dimensional coordinate system). In Equation (9), Q represents a projection matrix that is projected into the captured image of the sub camera (imaging device 16B) from a point in the real space (three-dimensional coordinate system). The projection matrixes are acquired by performing the calibration of the imaging devices 16 in advance and are stored in the image processing device 12 in advance.

By eliminating α and β from Equations (8) and (9), simultaneous equations represented in the following Equation (10) are acquired.

$$\begin{bmatrix} -p_{00} + p_{20}x_l & -p_{01} + p_{21}x_l & -p_{02} + p_{22}x_l \\ -p_{10} + p_{20}y_l & -p_{11} + p_{21}y_l & -p_{12} + p_{22}y_l \\ -q_{00} + q_{20}x_r & -q_{01} + q_{21}x_r & -q_{02} + q_{22}x_r \\ -q_{10} + q_{20}y_r & -q_{00} + q_{21}y_r & -q_{00} + q_{22}y_r \end{bmatrix} \begin{bmatrix} \tilde{X}_i \\ \tilde{Y}_i \\ \tilde{Z}_i \end{bmatrix} = \begin{bmatrix} p_{03} - p_{23}x_l \\ p_{13} - p_{23}y_l \\ p_{13} - p_{23}x_r \\ p_{13} - p_{23}y_r \end{bmatrix} \qquad (10)$$

Then, the second acquiring unit 32 calculates the provisional three-dimensional position of the target object i by acquiring a pseudo inverse matrix of a matrix represented on the left side of Equation (10) by using a least square method.

Next, the second acquiring unit 32 calculates the provisional size of the target object i in Step S106 based on the provisional three-dimensional position of the target object i that is calculated in Step S104 and the size of the search window of which the likelihood is the highest in Step S100.

The second acquiring unit 32 calculates the provisional size of the target object i, for example, by using a pinhole camera model in the process of Step S106.

Figure 7:
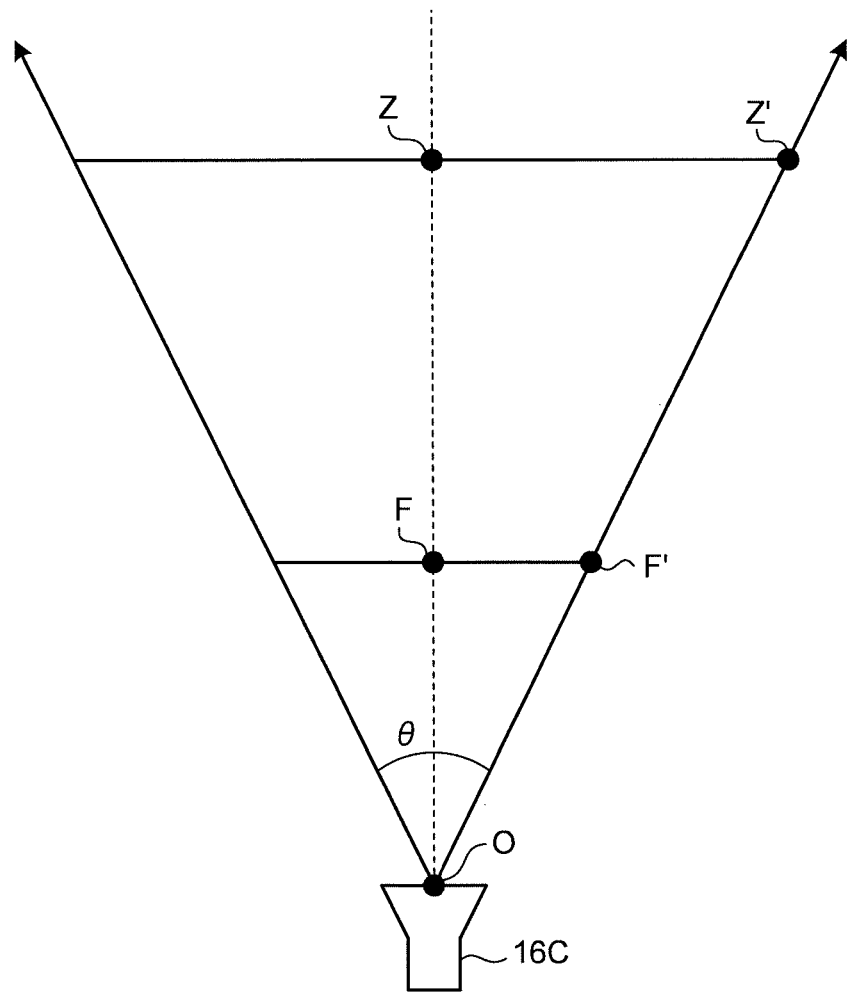
FIG. 7 is a diagram illustrating a pinhole camera model according to the first embodiment.

FIG. 7 is a schematic diagram illustrating the pinhole camera model. The angle of view of the imaging device 16 in the X-axis direction is $\theta_X$, the focal position of the captured image acquired by the imaging device 16 in the Z-axis direction is F, and the position of the target object i in the Z axis direction is Z. Then, a distance ZZ' that is a distance in the X-axis direction between the position of the target object i in the Z-axis direction and the end portion of the angle of view is represented by the following Equation (11). In addition, considering that an image of a half of the horizontal resolution $w_c$ of a captured image of the pinhole camera is projected in the range of the distance ZZ', the length per one pixel on the length ZZ' is represented by the following Equation (12).

$$ZZ' = OZ \times \tan(\theta_X/2) \tag{11}$$

$$ZZ'/(w_c/2) \tag{12}$$

In Equation (11), OZ represents the shortest distance from the imaging device 16 to the target object i in the Z-axis direction. In Equation (12), $w_c$ represents the horizontal resolution of the captured image of the pinhole camera.

In other words, the second acquiring unit 32 calculates a provisional size $W_X$ of the target object i in the X-axis direction by the following Equation (13) by using a Z coordinate $\check{Z}_i$ of the provisional three-dimensional position of the target object i and the horizontal resolution $w_c$ of the captured image of the pinhole camera. Similarly, the second acquiring unit 32 calculates a provisional size $W_Y$ of the target object i in the Y-axis direction by the following Equation (14). Here, $w_x$ represented on the right side of Equation (13) represents the number of pixels of the search window of which the likelihood is the highest in the x-axis direction in Step S100. In addition, $w_y$ represented on the right side of Equation (14) represents the number of pixels of the search window of which the likelihood is the highest in the y-axis direction in Step S100.

$$W_X = w_x \times 2\check{Z}_i \times \tan(\theta_X/2)/w_c \tag{13}$$

$$W_Y = w_y \times 2\check{Z}_i \times \tan(\theta_Y/2)/w_c \tag{14}$$

In addition, in the description presented above, the Z coordinate value $\check{Z}_i$ of the provisional three-dimensional position in the Z-axis direction from the imaging device 16 to the target object i is acquired by the triangulation using the stereo camera. However, the method of calculating the distance in the Z-axis direction from the imaging device 16 to the target object i is not limited thereto. For example, the distance in the Z-axis direction from the imaging device 16 to the target object i may be measured by using any other device such as a radar or a sensor, and an average value of measured values acquired by using a plurality of methods that are known may be used.

Referring back to FIG. 6, thereafter, the second acquiring unit 32 outputs the provisional three-dimensional position of the target object i that is calculated in Step S104 described above and the provisional size of the target object i that is calculated in Step S106 to the first setting unit 34 in Step S108 and ends this routine.

As the second acquiring unit 32 performs the process of Step S100 to Step S108, the second acquiring unit 32 acquires the provisional three-dimensional position and the provisional size of the target object i and outputs them to the first setting unit 34.

Here, the method of acquiring the provisional three-dimensional position and the provisional size by using the second acquiring unit 32 is not limited to the process illustrated in FIG. 6.

For example, a method may be used in which a captured image acquired from one imaging device 16 is used. As an example, a case will be described in which a captured image of the imaging device 16C installed to the center portion of the displaying unit 21 in the horizontal direction is used.

In such a case, the second acquiring unit 32, first, scans search windows having a plurality of types of search window sizes on the captured image of the imaging device 16C and detects the position of a target object on the captured image. The method of detecting the position of the target object may be performed similarly to that illustrated in the process of Step S100 and Step S102.

Figure 8:
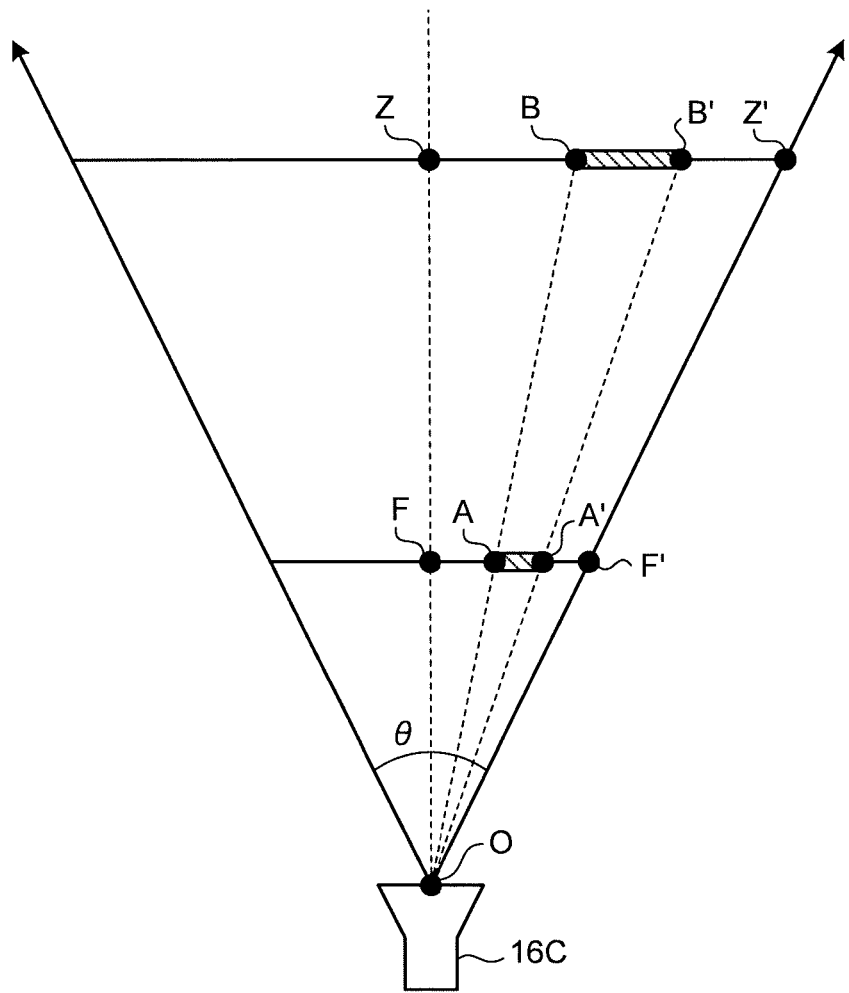
FIG. 8 is a diagram illustrating examples of a search window and the width of a target object according to the first embodiment.

FIG. 8 is a diagram illustrating a search window of a target object detected in the XZ plane that is configured by the X axis and the Z axis and the width of the target object on the X axis in the real space. The angle of view of the imaging device 16C in the X-axis direction is $\theta_X$, the focal position of the captured image acquired by the imaging device 16C in the Z-axis direction is F, and the position of the target object i in the Z axis direction is Z. Then, in FIG. 8, AA', BB', OF, and OZ have the relation of "AA':BB'=OF:OZ" based on the similarity relation. Here, AA' represents the width of the search window in the X-axis direction in the captured image of the imaging device 16C. In addition, BB' represents the actual width of the target object in the X-axis direction. OF represents a distance from the imaging device 16C to the focal position F. In addition, OZ represents a distance from the imaging device 16C to the position Z of the target object.

Here, FF' that is the distance from the focal position F to the end portion of the captured image is set to a value $w_c/2$ corresponding to a half of the horizontal resolution of the monocular camera (imaging device 16C). Then, OF=FF'/tan ($\theta_X/2$).

Here, it is assumed that the width AA' of the search window in the X-axis direction in the captured image of the imaging device 16C is the number of pixels of the search window in the x-axis direction. Although BB' is the actual width of the target object in the X-axis direction, an average size of a target object is assumed. For example, in the case of a face, the horizontal width of an average face is described as 14 cm.

Accordingly, the second acquiring unit 32 calculates the distance OZ from the imaging device 16C to the target object by using the following Equation (15).

$$OZ = \frac{BB' * OF}{AA'} \tag{15}$$

In other words, the second acquiring unit 32 acquires the Z coordinate of the provisional three-dimensional position of the target object based on the width that is represented by the number of pixels of the search window in the captured image of the imaging device 16C.

In FIG. 8, AF, BZ, OF, and OZ have the relation of "AF:BZ=OF:OZ" based on the similarity relation. Here, AF represents a distance from the end portion A of the search window in the X axis direction to the focal position F in the captured image of the imaging device 16C. In addition, BZ represents a distance from the end portion B of the target object in the X-axis direction to the position Z of the target object in the Z-axis direction.

Accordingly, the second acquiring unit 32 acquires the distance BZ, thereby acquiring the X coordinate of the provisional three-dimensional position of the target object. Then, also for the YZ plane configured by the Y axis and the Z axis, similarly, the second acquiring unit 32 acquires the Y coordinate of the provisional three-dimensional position of the target object.

As above, the second acquiring unit 32 may acquire the provisional three-dimensional position of the target object by using a captured image acquired from one imaging device 16C.

In a case where a captured image acquired from one imaging device 16C is used, as described above, the average size of the target object needs to be set in advance. Accordingly, the calculation accuracy of the method of calculating the provisional size of the target object by using the captured image acquired from one imaging device 16C is lower than that of a method using captured images acquired by a stereo camera. Thus, in a case where the provisional size of the target object is calculated by using the captured image acquired by one imaging device 16C, the image display apparatus 10 may be configured to further include a distance measuring meter. In a case where the Z coordinate of the target object is used by using the distance measuring meter, the average size of a target object does not need to be set in advance, and thereby a provisional size can be acquired with high accuracy.

Here, the method of acquiring the provisional size and the provisional three-dimensional position of a target object by using the second acquiring unit 32 is not limited to the above-described method.

Referring back to FIG. 5, the second acquiring unit 32 outputs the provisional three-dimensional position of the target object and the provisional size of the target object to the first setting unit 34.

The first setting unit 34 acquires the provisional three-dimensional position of the target object and the provisional size of the target object from the second acquiring unit 32. Then, the first setting unit 34 sets one or a plurality of search candidate points near the provisional three-dimensional position in the real space. The search candidate point is a point that is a candidate used for estimating the actual position of the target object in the real space. Then, the first setting unit 34 outputs the set search candidate points and the provisional three-dimensional position and the provisional size of the target object, which have been received from the second acquiring unit 32, to the estimating unit 36. Here, "near the provisional three-dimensional position in the real space" represents "within a range set in advance near the provisional three-dimensional position".

The first setting unit 34, for example, in accordance with a random walk model defined by Gaussian, sets the search candidate points near the provisional three-dimensional position that has been acquired from the second acquiring unit 32.

Described in detail, the first setting unit 34 sets the search candidate points near the provisional three-dimensional position acquired from the second acquiring unit 32 in accordance with a random number according to a three-dimensional Gaussian distribution $N(\mu, S)$. Here, $\mu$ is a three-dimensional vector that represents the provisional three-dimensional position of a target object. In addition, S represents the generation range of the random number. Described in detail, this range S is represented as a matrix represented in Equation (16).

$$S = \begin{bmatrix} \sigma_x & & \\ & \sigma_y & \\ & & \sigma_z \end{bmatrix} \quad (16)$$

In Equation (16), $\sigma_X$ represents the degree of spread (a standard deviation in the X-axis direction) of the three-dimensional Gaussian distribution in the X-axis direction, $\sigma_Y$ represents the degree of spread (a standard deviation in the Y-axis direction) of the three-dimensional Gaussian distribution in the Y-axis direction, and $\sigma_Z$ represents the degree of spread (a standard deviation in the Z-axis direction) of the three-dimensional Gaussian distribution in the Z-axis direction.

In Equation (16), the larger value $\sigma_X$ has, the larger becomes the spread of the Gaussian distribution in the X-axis direction. In other words, as $\sigma_X$ has a larger value, the occurrence range of the search candidate points in the X-axis direction is widened, whereby a speedy movement of a target object can be responded. However, as $\sigma_X$ has a larger value, the search candidate points are sparsely disposed, whereby there is a concern that the accuracy of the position estimation of the target object may be decreased. This similarly applies to $\sigma_Y$ and $\sigma_Z$.

Thus, in this embodiment, as the frame rate of the captured image acquired from the first acquiring unit 30 is lower, the first setting unit 34 sets smaller values to $\sigma_X$, $\sigma_Y$, and $\sigma_Z$ represented in Equation (16). The reason for this is understood that, as the frame rate of the captured image acquired from the first acquiring unit 30 is lower, the photographing interval is shorter, and the movement of the target object is smaller. In such a case, information representing the frame rate of the captured image may be acquired by the first setting unit 34 from the first acquiring unit 30. In addition, the first setting unit 34 may store information, which represents $\sigma_X$, $\sigma_Y$, and $\sigma_Z$ having smaller values as the frame rate is lower, in association with the frame rate of the captured image in advance.

Alternatively, the first setting unit 34 sets larger values as $\sigma_X$, $\sigma_Y$, and $\sigma_Z$ represented in Equation (16) as the estimation accuracy of the provisional three-dimensional position acquired by the second acquiring unit 32 is lower. The estimation accuracy of the provisional three-dimensional position is low, for example, in a case where an estimation method having low accuracy is used as the method of estimating the provisional three-dimensional position. In addition, the estimation accuracy of the provisional three-dimensional position is low, for example, also in a case where the environment for detecting the captured image is bad, in other words, a noise is included in the captured image. A case where a noise is included in the captured image, for example, is a case where a target object is imaged in a dark environment or the like. In addition, the estimation accuracy of the provisional three-dimensional position is low, for example, also in a case where a captured image in which the target object is out-of-focus is acquired due to a high-speed movement of the target object. Thus, the second acquiring unit 32 stores values of $\sigma_X$, $\sigma_Y$, and $\sigma_Z$ corresponding to the factors contributing to the estimation accuracy of the provisional three-dimensional position in advance. In addition, it may be configured such that an acquiring unit such as a detecting device used for acquiring one or a plurality of the factors are further included, the factors are specified based on information acquired from the acquiring unit, and $\sigma_X$, $\sigma_Y$, and $\sigma_Z$ corresponding to the specified factors are used.

Alternatively, the first setting unit 34 may set $\sigma_X$ and $\sigma_Y$ represented in Equation (16) described above to WX and WY. Here, WX represents the size of the provisional size of the target object on the X axis. In addition, WY represents the size of the provisional size of the target object on the Y axis.

In addition, in the above-described example, a case has been described in which the first setting unit 34 sets the search candidate point in the range S having the provisional three-dimensional position μ of the target object, which is acquired from the second acquiring unit 32, as its center. However, the method of setting the search candidate point is not limited thereto. For example, the first setting unit 34 may set one or a plurality of positions acquired by adding a random value to the provisional three-dimensional position μ of the target object that is acquired from the second acquiring unit 32 as the provisional three-dimensional position and set the search candidate point within the range S having the above-described provisional three-dimensional position as its center. Furthermore, although it has been described that the movement of the target object follows a random walk, in a case where there is prerequisite knowledge relating to the movement, a search candidate point according to the kinetic model may be set but is not limited to the random walk.

The estimating unit 36 acquires a plurality of captured images of a target object from the first acquiring unit 30. In addition, the estimating unit 36 acquires the search candidate point representing one or a plurality of three-dimensional position coordinates and sample point data including the provisional size of the target object acquired from the second acquiring unit from the first setting unit 34. Then, the estimating unit 36 calculates the three-dimensional position of the target object and the size of the target object and outputs them to the display device 14.

The estimating unit 36 includes a second setting unit 38, a first calculating unit 40, a second calculating unit 42, and a third calculating unit 44.

The second setting unit 38 sets a search window that is used for searching a target object and has a size that is based on the position of the search candidate point and the provisional size for each projection position (two-dimensional position) at which the search candidate point is projected on each captured image acquired from the first acquiring unit 30.

The first calculating unit 40 calculates an evaluation value representing the degree to which the target object is included inside the set search window for each projection position at which the search candidate point i is projected in each captured image acquired from the first acquiring unit 30. In addition, in this embodiment, as this evaluation value, the likelihood li (first likelihood) of the search candidate point i that represents whether or not the target object is included inside the search window is used.

The third calculating unit 44 calculates likelihood $L_i$ (second likelihood) that represents the degree to which the target object exists at the search candidate point i in the real space, which corresponds to the projection position, based on the evaluation value calculated for each projection position at which the search candidate point i is projected in each one of the plurality of captured images.

The second calculating unit 42 calculates the three-dimensional position of the target object in the real space and the size of the target object based on the second likelihood calculated for each search candidate point in the real space.

Figure 9:
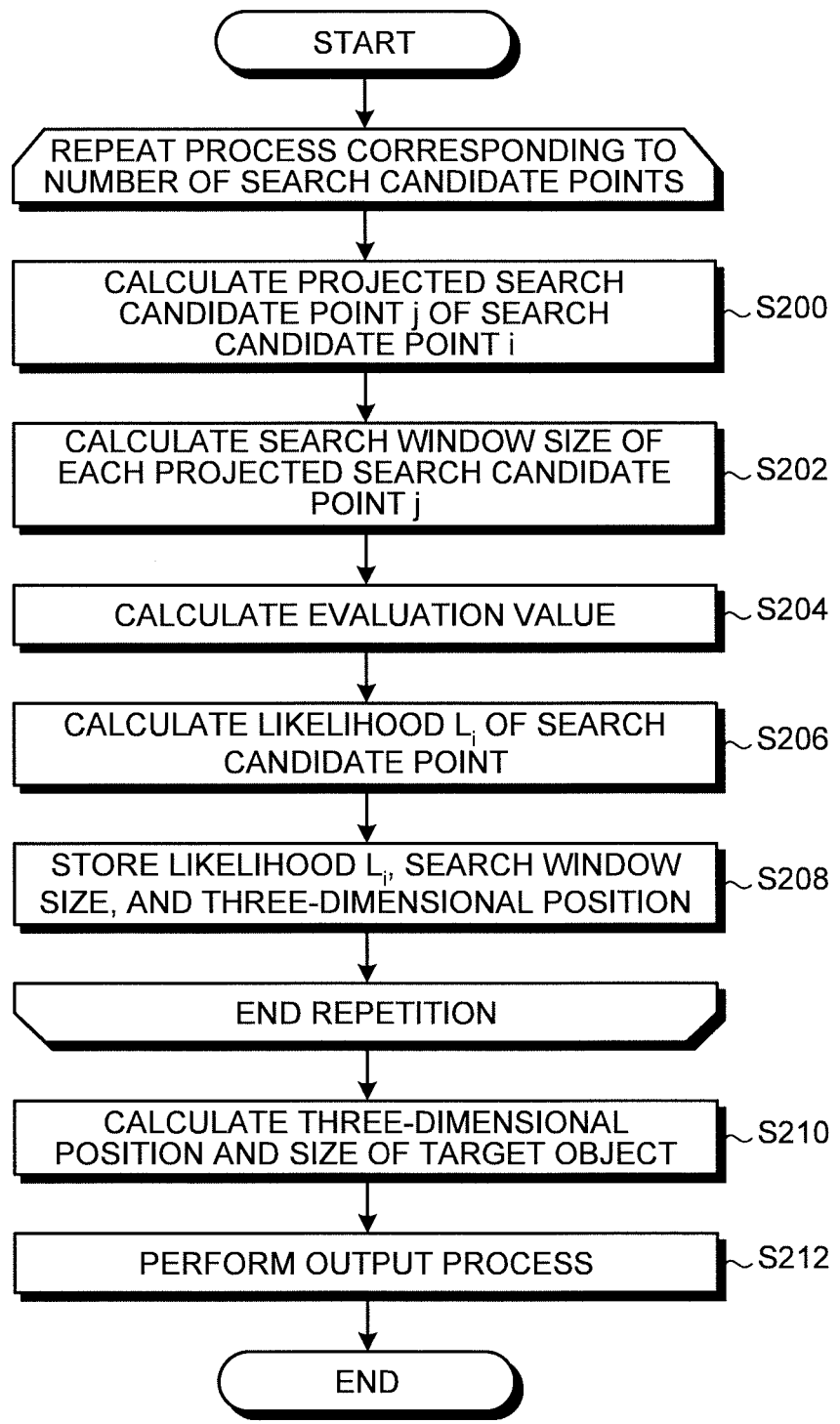
FIG. 9 is a flowchart of a calculation process according to the first embodiment.

Next, the sequence of the process of calculating the three-dimensional position of a target object and the size of the target object, which is performed by the estimating unit 36, will be described. FIG. 9 is a flowchart illustrating the sequence of the process of calculating the three-dimensional position of a target object and the size of the target object, which is performed by the estimating unit 36.

The estimating unit 36 repeatedly performs the process of Steps S200 to S208 in accordance with the number of the search candidate points received from the first setting unit 34.

First, the second setting unit 38 calculates projection positions of the projected search candidate point j at which one search candidate point (hereinafter referred to as a search candidate point i) is projected on each one of the plurality of captured images acquired from the first acquiring unit 30 in Step S200. In addition, it is assumed that camera calibration is performed in advance in each imaging device 16, and a projection matrix used for projecting the three-dimensional position on the captured image is stored in the second setting unit 38 in advance.

Then, the second setting unit 38 calculates a search window size for each projection position of the projected search candidate point j based on the Z coordinate of the search candidate point i and the provisional size of the target object in Step S202.

The process of calculating the search window size of Step S202, which is performed by the second setting unit 38, will be described with reference to FIG. 8. First, the size (hereinafter, referred to as a reference search window size) of a case where the target object of the provisional size is projected on the captured image is acquired. As described above, the relation of "AA':BB'=OF:OZ" illustrated in FIG. 8 is used based on the similarity relation. Here, BB' represents the provisional size of the target object. OF is calculated, as described above, based on the resolution of the imaging device 16 and the angle of view. In addition, OZ is the Z coordinate of the search candidate point i. Accordingly, based on these values, the second setting unit 38 calculates the reference search window size AA'. This reference search window size is set as the search window size of the search candidate point i.

In addition, when the search window size of the search candidate point i is to be acquired, the second setting unit 38 acquires the search window size based on a random number according to the probability density function represented by the following Equation (17) by using the reference search window size of the target object.

$$p(w) = \frac{1}{\sqrt{2\pi}\sigma_w} \exp\left(-\frac{(w - w_0)^2}{2\sigma_w^2}\right) \qquad (17)$$

In Equation (17), $w_O$ is the reference search window size. In addition, In Equation (17), $\sigma_W$ represents the magnitude of the random number dispersion and is set to a smaller value in advance as the estimation accuracy of the second acquiring unit 32 for the provisional size is increased.

The estimation accuracy of the second acquiring unit 32 for the provisional size is high, for example, in a case where an estimation method having high accuracy is used as the method of estimating the provisional size. In addition, the estimation accuracy of the provisional size is high in a case where the environment for detecting the captured image is excellent, in other words, there is a little noise included in the captured image. A case where a noise included in the captured image is a little, for example, is a case where the target object is imaged under a bright environment or the like. In addition, a case where the estimation accuracy of the provisional size is high also includes a case where a captured image that is in-focus with the target object is acquired. Thus, the second acquiring unit 32 stores the values of $\sigma_W$ corresponding to the factors contributing to the estimation accuracy of the provisional size in advance. Then, it may be configured such that an acquiring unit such as a detecting device used for acquiring one or a plurality of the factors are further included, the factors are specified based on information acquired from the acquiring unit, and $\sigma_W$ corresponding to the specified factors is used.

Then, the second setting unit 38 acquires one or a plurality of search windows of random numbers generated similarly to the description presented above. In other words, search candidate points i-1 to 1-n that have three-dimensional position coordinates of the search candidate points i and have different search window sizes are newly generated (here, n is an integer that is "1" or more).

Referring back to FIG. 9, the estimating unit 36 may perform the process of Steps S204 to S208 described below for each one of the n sample points i-n.

Next, the first calculating unit 40 calculates an evaluation value for each projection position of a projected search candidate point j at which the search candidate point i is projected in each captured image acquired from the first acquiring unit 30 in Step S204. In this embodiment, as described above, the first calculating unit 40 calculates the likelihoods $l_{i,j}$ as the evaluation values. The first calculating unit 40 performs the calculation of the likelihoods $l_{i,j}$ for all the captured images acquired from the first acquiring unit 30, in other words, for all j values.

Described in detail, the first calculating unit 40 calculates the likelihoods $l_{i,j}$ by using the above-described search method. In other words, the first calculating unit 40 calculates the likelihoods $l_i$ by using Equations (1) to (3) described above.

Next, the third calculating unit 44 calculates the likelihood $L_i$ that represents the degree to which a target object exists at the search candidate point i in the real space, which correspond to the projection positions, in Step S206 based on the evaluation values (the likelihoods calculated for the projection positions in Step S204 described above.

The third calculating unit 44 uses various calculation methods as the methods of calculating the likelihood $L_i$. For example, the third calculating unit 44 calculates the likelihood $L_i$ by using the following Equation (18).

$$L_i = \prod_j^M l_{i,j} \tag{18}$$

In Equation (18), $\Pi$ represents a product, and M represents the number of the imaging devices 16 installed to the image display apparatus 10.

At this time, when the likelihoods $l_{i,j}$ at a specific projected search candidate point j are zero, the third calculating unit 44 output the likelihood $L_i$ at the searched candidate point i as zero. Accordingly, a likelihood calculating process that has not been calculated yet may not be performed in the third calculating unit 44.

In addition, the third calculating unit 44 may calculate an average value of the likelihoods $l_{i,j}$ as the likelihood $L_i$.

$$L_i = \frac{1}{M} \sum_j^M l_{i,j} \tag{19}$$

In Equation (19), M represent the number of the imaging devices 16 installed to the image display apparatus 10.

In addition, the third calculating unit 44 may calculate the maximum value of the likelihoods a median value of the likelihoods or a weighted median value of $l_{i,j}$ as the likelihood $L_i$. Furthermore, the third calculating unit 44 may combine a plurality of types of methods of calculating the likelihood $L_i$, and calculate an average value of values acquired by using the types of calculation methods or a median value of values acquired by using the types of calculation methods as the likelihood $L_i$.

In addition, although the third calculating unit 44 has been described to calculate the likelihood $L_i$ that represents the degree to which the target object exists at the search candidate point i in the real space as the likelihood $L_i$, in contrary to this, the third calculating unit 44 may calculate the likelihood of a non-target object and calculate the likelihood $L_i$ of a target object by subtracting the calculated likelihood of a non-target object from "1".

Next, the third calculating unit 44 stores the search window size $\lambda_i$ used at the time of acquiring the likelihood $L_i$ of the search candidate point i and the three dimensional point $P_i$ of the search candidate point i in Step S208. Here, P is a vector that represents a three-dimensional position.

When the process of Steps S200 to S208 described above is performed for all the search candidate points, the second calculating unit 42 calculates the three-dimensional position P of the target object and the size of the target object in Step S210.

In the process of Step S210, the second calculating unit 42 calculates the three-dimensional position P of the target object and the size of the target object by using the three-dimensional position $P_i$ of the search candidate point i of the target object, the likelihood $L_i$, and the search window size $\lambda_i$ used at the time of acquiring the likelihood $L_i$ that are stored in Step S208.

There are a plurality of methods of acquiring the three-dimensional position P of the target object by using the second calculating unit 42. For example, the second calculating unit 42 sets the likelihood $L_i$ of each search candidate point as a weighting factor and calculates the three-dimensional position P of the target object as a weighted average of the three-dimensional positions of the search candidate points. In this case, the second calculating unit 42 calculates the three-dimensional position P of the target object by using the following Equation (20).

$$P = \frac{1}{K} \sum_{i \in I} L_i P_i \tag{20}$$

In Equation (20), K is a normalization constant and is represented in Equation (21). In each equation, I represents a set that includes all the search candidate points.

$$K = \left( \sum_{i \in I} l_i \right)^{-1} \tag{21}$$

In addition, the method of calculating the three-dimensional position P of the target object by using the second calculating unit 42 is not limited to the above-described method. For example, Methods A to F described below can be used.

Method A is a method in which the three-dimensional coordinates of the search candidate point at which the likelihood $L_i$ is the maximum out of all the search candidate points are calculated as the three-dimensional position P of the target object. Method B is a method in which the three-dimensional coordinates of the search candidate point at which the likelihood $L_i$ is the median value out of all the search candidate points are calculated as the three-dimensional position P of the target object. Method C is a method in which the three-dimensional coordinates of the search candidate point of which the likelihood is closest to the average value of the likelihoods $L_i$ of all the search candidate points are calculated as the three-dimensional position P of the target object. Method D is a method in which the search candidate points having the likelihoods $L_i$ that are a predetermined threshold value or more out of the likelihoods $L_i$ of all the search candidate points are extracted, and an average value of the likelihoods $L_i$ of the extracted search candidate points is calculated as the three-dimensional position P of the target object. Method E is a method in which the search candidate points having the likelihoods $L_i$ that are a predetermined threshold value or more out of the likelihoods $L_i$ of all the search candidate points are extracted, and a weighted average value of the coordinates of the search candidate points acquired by using the likelihoods $L_i$ of the extracted search candidate points as the weighting factor is calculated as the three-dimensional position P of the target object. Method F is a method in which the search candidate points having the likelihoods $L_i$ that are a predetermined threshold value or more out of the likelihoods $L_i$ of all the search candidate points are extracted, and the three dimensional coordinates of the search candidate point corresponding to a median value of the likelihoods $L_i$ of the extracted search candidate points are calculated as the three-dimensional position P of the target object.

In addition, the second calculating unit 42 may combine the above-described methods and calculate the average, the median value, or the like as the three dimensional position P of the target object.

Furthermore, there are a plurality of methods of calculating the size of the target object by using the second calculating unit 42. For example, there are Methods G to M described below.

Method G is a method in which the size $\lambda$, of the target object is set as a weighting factor of the likelihood $L_i$ of the search candidate point set by the first setting unit 34, and the size of the target object is acquired as a weighted average of the search window sizes of the search candidate points. In this case, $\lambda$ is calculated by using the following Equation (22).

$$\lambda = \frac{1}{K}\sum_{i \in I} L_i \lambda_i \tag{22}$$

In Equation (22), I represents a set that includes all the search candidate points. In addition, in Equation (22), K is a normalization constant that is represented in Equation (21) described above.

In addition, Method H is a method in which the search window size of the search candidate point of which the likelihood $L_i$ is the maximum out of all the search candidate points set by the first setting unit 34 is set as the size $\lambda$ of the target object. Method I is a method in which the search window size of the search candidate point of which the likelihood $L_i$ is the median value out of all the search candidate points set by the first setting unit 34 is set as the size $\lambda$ of the target object. Method J is a method in which the search window size of the search candidate point of which the likelihood $L_i$ is closest to the average value of the likelihoods $L_i$ out of all the search candidate points set by the first setting unit 34 is set as the size $\lambda$ of the target object. Method K is a method in which the search candidate points having the likelihoods $L_i$ that are a predetermined threshold value or more are extracted out of all the search candidate points set by the first setting unit 34, and an average of the search window sizes of the extracted search candidate points is set as the size $\lambda$ of the target object. Method L is a method in which the search candidate points having the likelihoods $L_i$ that are a predetermined threshold value or more are extracted out of all the search candidate points set by the first setting unit 34, and a weighted average of the search window sizes of the extracted search candidate points is set as the size $\lambda$ of the target object. Method M is a method in which the search candidate points having the likelihoods $L_i$ that are a predetermined threshold value or more are extracted out of all the search candidate points set by the first setting unit 34, and a search window size of the search candidate point, which represents a median value of the search window sizes of the extracted search candidate points, is set as the size $\lambda$ of the target object.

Next, the estimating unit 36 outputs the three-dimensional position of the target object and the size of the target object, which have been calculated in Step S210, to the display device 14 in Step S212 and thereafter ends this routine.

In addition, the output destination of the three-dimensional position of the target object and the size of the target object, which have been calculated in Step S210, is not limited to the display device 14. For example, the image processing device 12 is configured to be connected to various external devices through a wired network or a wireless network. As the various external devices, for example, there are known storage medium, a personal computer, a mobile terminal, and the like. Then, the estimating unit 36 may output the three-dimensional position of the target object and the size of the target object calculated in Step S210 to these various external devices.

Figure 10:
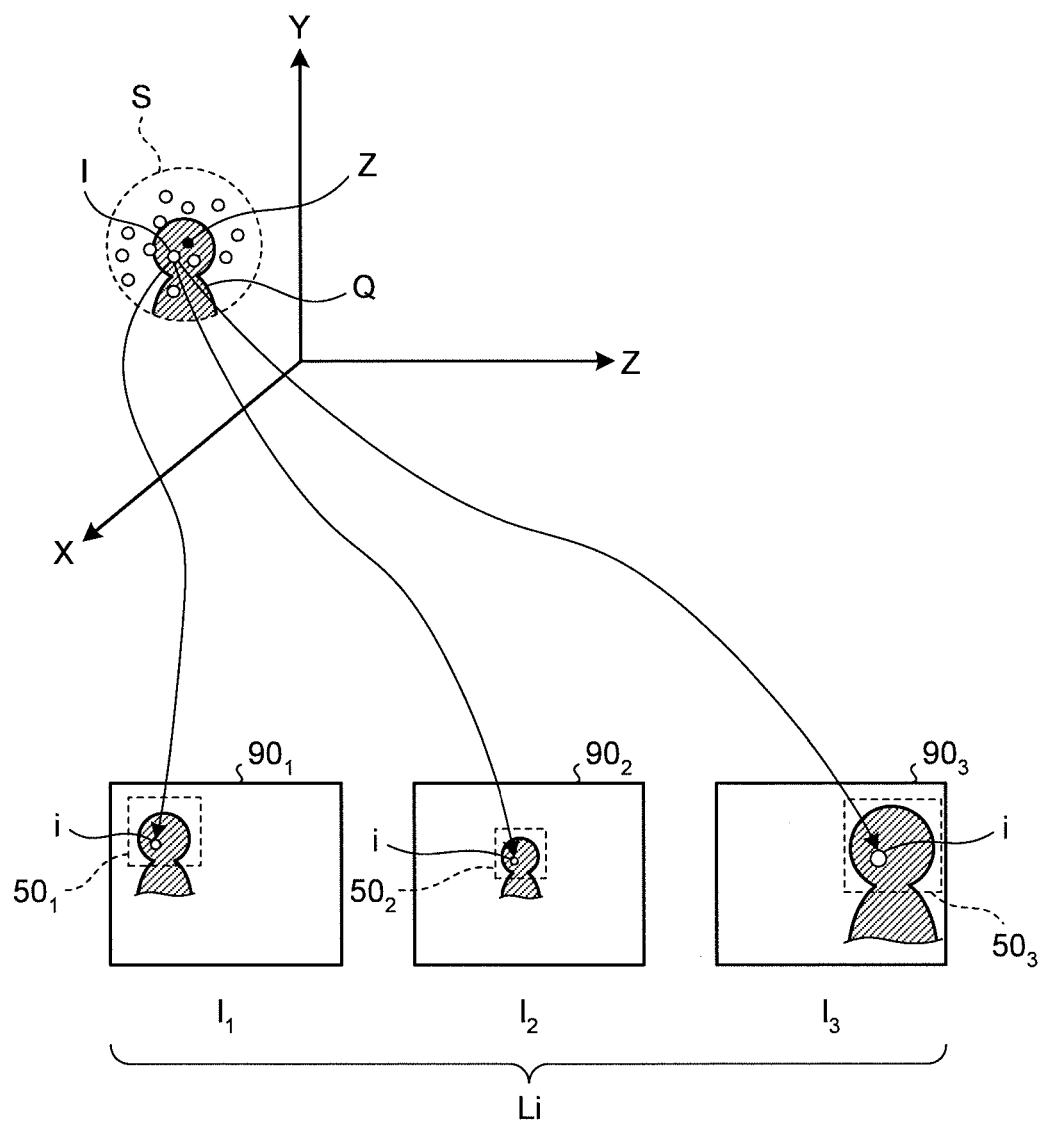
FIG. 10 is a diagram illustrating a calculation sequence according to the first embodiment.

FIG. 10 is a schematic diagram illustrating the sequence of calculating the likelihoods $L_i$. As the second acquiring unit 32 acquires the provisional three-dimensional position of the target object and the provisional size of the target object, as illustrated in FIG. 10, the image processing device 12 acquires the provisional three-dimensional position Z and the provisional size of the target object Q in the real space. The first setting unit 34 sets one or a plurality of search candidate points I within a predetermined area S near the provisional three-dimensional position Z. As illustrated in FIG. 10, the second setting unit 38 of the estimating unit 36 calculates the search window sizes of search windows $50_1$ to $50_3$, which correspond to one search candidate point I, located at the projection positions i on captured images $90_1$ to $90_3$. Then, the first calculating unit 40 sets the likelihoods $l_1$ to $l_3$ that are evaluation values for the projection positions i. The third calculating unit 44 calculates the likelihood $L_i$ of the provisional three-dimensional position Z based on the calculated likelihoods 11 to 13. Then, the second calculating unit 42 calculates the three-dimensional position and the size of the target object.

As described above, the image processing device 12 according to this embodiment includes the first acquiring unit 30, the second acquiring unit 32, the first setting unit 34, the second setting unit 38, the first calculating unit 40, and the second calculating unit 42. The first acquiring unit 30 acquires a plurality of captured images of a target object. The second acquiring unit 32 acquires the provisional position of the target object and the provisional size of the target object. The first setting unit 34 sets search candidate points within a range set in advance near the provisional three-dimensional position in the real space. The second setting unit 38, for each one of the plurality of captured images, sets the search window size for each projection position based on the projection position corresponding to the search candidate point located on the captured image and the provisional size. Then, the first calculating unit 40, for each projection position on each one of the plurality of captured images, calculates an evaluation value that represents the degree to which the target object is included inside the search window having the set search window size. The second calculating unit 42 calculates the three-dimensional position of the target object based on the evaluation value for each projection position on each one of the plurality of captured images.

As above, in the image processing device 12 of this embodiment, in a case where a target object is to be searched using the search method, the second setting unit 38, for each one of the plurality of captured images, sets the search window size for each projection position, which is based on the projection position on the captured image and the provisional size, corresponding to the search candidate point near the provisional three-dimensional position of the target object. As above, since the search window size for each projection position is set based on the projection position at which the search candidate point is projected on the captured image and the provisional size of the target object, a decrease in the calculation accuracy of the three dimensional position due to individual differences in the target objects can be suppressed.

Accordingly, the image processing device 12 of this embodiment can calculate the three-dimensional position of the target object with high accuracy. In addition, the image processing device 12 can calculate the size of the target object with high accuracy.

Furthermore, since the image processing device 12 of this embodiment sets the search window size for each projection position based on the projection position at which the search candidate point is projected on the captured image and the provisional size of the target object, the three-dimensional position and the size of the target object can be more efficiently calculated at high speed.

Second Embodiment

In this embodiment, the three dimensional position of the target object and the size of the target object that have been previously calculated by the estimating unit 36 are used as the provisional position and the provisional size for the next calculation process.

Figure 11:
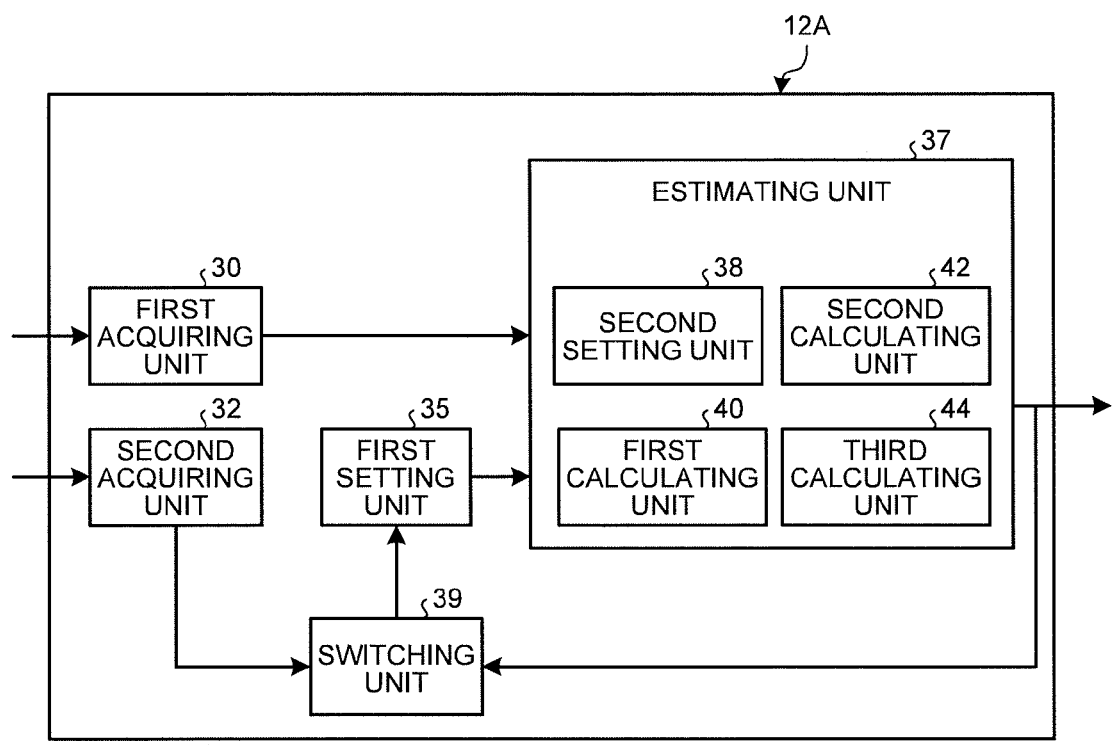
FIG. 11 is a diagram of an image processing device according to a second embodiment.

FIG. 11 is a block diagram illustrating the functional configuration of an image processing device 12A according to this embodiment.

The image processing device 12A includes a first acquiring unit 30, a second acquiring unit 32, a first setting unit 35, a switching unit 39, and an estimating unit 37. The estimating unit 37 includes a second setting unit 38, a first calculating unit 40, a second calculating unit 42, and a third calculating unit 44.

Here, since the first acquiring unit 30, the second acquiring unit 32, the second setting unit 38, the first calculating unit 40, the second calculating unit 42, and the third calculating unit 44 are similar to those of the image processing device 12 described in the first embodiment, the description thereof will not repeated here.

In this embodiment, the second acquiring unit 32 outputs the provisional size of the target object the provisional three-dimensional position of the target object to the switching unit 39 instead of the first setting unit 34. In addition, in this embodiment, the estimating unit 37 outputs the three-dimensional position of the target object and the size of the target object, which are calculated by the second calculating unit 42, to a display device 14. Furthermore, the estimating unit 37 outputs sample point data that includes the size of the target object that is calculated by the second calculating unit 42 as the provisional size of the target object and the three-dimensional positions and the search sizes of all the search candidate points that are newly generated again by the estimating unit 37 to the switching unit 39.

The switching unit 39 acquires first data that includes the provisional three-dimensional position and the provisional size of the target object from the second acquiring unit 32. In addition, the switching unit 39 acquires the sample point data from the estimating unit 37. Then, the switching unit 39 selects one of the first data acquired from the second acquiring unit 32 and the sample point data acquired from the estimating unit 37 and outputs the selected data to the first setting unit 35.

The switching unit 39 selects one of the first data acquired from the second acquiring unit 32 and the sample point data acquired from the estimating unit 37 by using the following method.

For example, the switching unit 39 includes an internal timer. Then, when the first data has not been received from the second acquiring unit 32 within the processing time of the second acquiring unit 32, which is measured in advance, the switching unit 39 outputs the sample point data acquired from the estimating unit 37 to the first setting unit 35.

In addition, in a case where the sample point data has not been received from the estimating unit 37 within a time set in advance, the switching unit 39 outputs the first data acquired from the second acquiring unit 32 to the first setting unit 35. The reason for this is that there is no output from the estimating unit 37 in a state in which a target object is not detected.

On the other hand, in a case other than the above-described two cases, the switching unit 39 outputs the sample point data received from the estimating unit 37 to the first setting unit 35.

The first setting unit 35 receives the first data or the sample point data from the switching unit 39. The first setting unit 35 performs a different process depending on whether the data received from the switching unit 39 is the first data or the sample point data.

In a case where the received data is the first data output from the second acquiring unit 32, the first setting unit 35, similarly to the first setting unit 34 described in the first embodiment, sets search candidate points. Then, the first setting unit 35 generates sample point data that includes the set search candidate points and the provisional size of the target object acquired from the second acquiring unit 32 through the switching unit 39 and outputs the generated sample point data to the estimating unit 37.

On the other hand, in a case where the data received from the switching unit 39 is the sample point data output from the estimating unit 37, the first setting unit 35 modifies the three-dimensional positions of the search candidate points included in the received sample point data and outputs the modified sample point data to the estimating unit 37.

In a case where the data received by the first setting unit 35 from the switching unit 39 is the sample point data output from the estimating unit 37, the three-dimensional positions of the search candidate points of the target object that are included in the received sample point data are past three-dimensional positions. Accordingly, the first setting unit 35 modifies the three-dimensional positions of the search candidate points included in the received sample point data according to the following kinetic model.

As an example, a six-dimensional vector $P_t$ acquired by adding speeds in the directions of the X axis, the Y axis, and the Z axis (denoted by a dot above a letter) to the three-dimensional positions $X_t$, $Y_t$, and $Z_t$ of the search candidate point at time t is represented in the following Equation (23).

$$P_t = [X_t, Y_t, Z_t, \dot{X}_t, \dot{Y}_t, \dot{Z}_t] \quad (23)$$

In addition, when the sample point data is received from the estimating unit 37 through the switching unit 39, the provisional three-dimensional position of the target object at time t−1 is represented as a six-dimensional vector $P_{t-1}$. Then, by assuming that the target object is at a uniform linear motion, the first setting unit 35 calculates the six-dimensional vector $P_t$ by using Equation (24).

$$P_t = F P_{t-1} \quad (24)$$

In Equation (24), F is represented by the following Equation (25).

$$F = \begin{bmatrix} 1 & 0 & 0 & 1 & 0 & 0 \\ 0 & 1 & 0 & 0 & 1 & 0 \\ 0 & 0 & 1 & 0 & 0 & 1 \\ 0 & 0 & 0 & 1 & 0 & 0 \\ 0 & 0 & 0 & 0 & 1 & 0 \\ 0 & 0 & 0 & 0 & 0 & 1 \end{bmatrix} \quad (25)$$

In addition, the covariance matrix follows Equation (16) described above. Here, an element representing the speed is a three-dimensional Gaussian distribution N(0, S). Additionally, in the case of a constant acceleration motion, the vector $P_t$ may be acquired based on the assumed model. In addition, the matrix F may be set as a unit matrix. In such a case, the speed is not reflected on the vector $P_t$ and is the same as the random walk model.

The estimating unit 37 acquires a plurality of captured images of a target object from the first acquiring unit 30. In addition, the estimating unit 37 receives the sample point data from the first setting unit 35. Then, similarly to the estimating unit 36 of the first embodiment, the estimating unit 37 calculates the three-dimensional position of the target object and the size of the target object and outputs them. In addition, as described above, the estimating unit 37 additionally outputs the sample point data that includes the three-dimensional position of the target object and the size of the target object, which are calculated by the second calculating unit 42, and the likelihood $L_i$ of each search candidate point calculated by the third calculating unit 44 to the switching unit 39.

Figure 12:
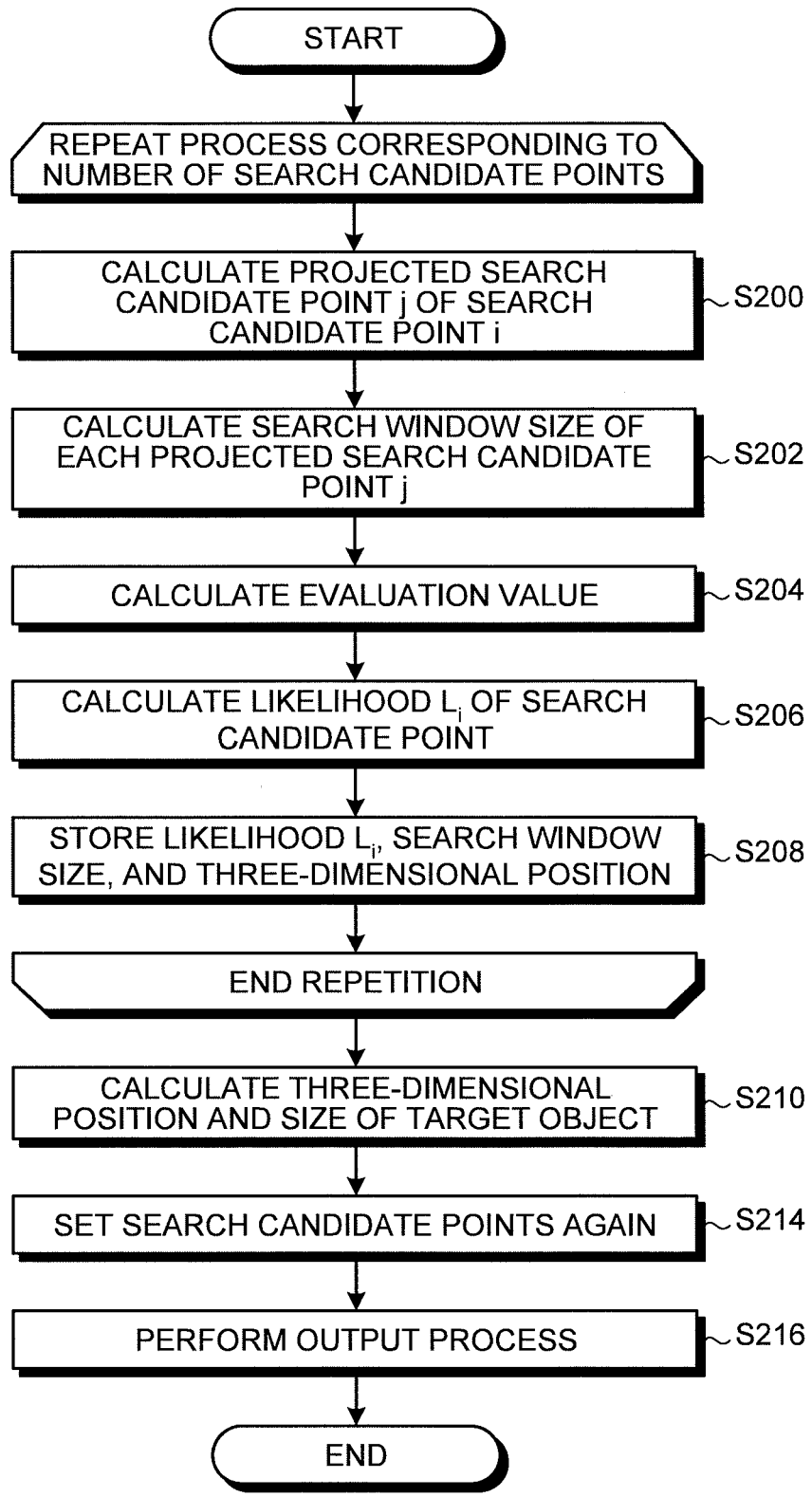
FIG. 12 is a flowchart of a calculation process according to the second embodiment.

Next, the sequence of the process of calculating the three-dimensional position of the target object and the size of the target object, which is performed by the estimating unit 37, will be described. FIG. 12 is a flowchart illustrating the sequence of the process of calculating the three-dimensional position of the target object and the size of the target object that is performed by the estimating unit 37.

The estimating unit 37 repeatedly performs the process of Step S200 to Step S208 in correspondence with the number of the search candidate points received from the first setting unit 35. Since the process of Step S200 to Step S208 is the same as the calculation process (Step S200 to Step S208 of FIG. 9) of the estimating unit 36 described in the first embodiment, detailed description thereof will not be presented here.

When the estimating unit 37 performs the process of Step S200 to Step S208 for all the search candidate points, the second calculating unit 42 calculates the three-dimensional position P of the target object and the size of the target object in Step S210. In addition, the process of Step S210 is similar to the process of Step S210 illustrated in FIG. 9.

Next, the estimating unit 37 sets the search candidate points used in the next calculation process in Step S214 such that many search candidate points used in the next calculation process of the estimating unit 37 are located near the search candidate point having a high likelihood $L_i$ calculated in Step S208.

In the process of Step S214 performed by the estimating unit 37, the search candidate points of time t+1 may be set to be near the search candidate point i having the high likelihood $L_i$ out of the search candidate points acquired by the process of the estimating unit 37 at time t. Here, the search size included in the search candidate points that are newly set may be copied, or, in Equation (17), the reference search window size may be designated by a random number that is based on the probability density function set as the search window size of the search candidate points at the time t when copying is performed.

The method of setting the search candidate points used for the next calculation process such that many search candidate points used in the calculation process of the estimating unit 37 at the next time t+1 are located near the search candidate point having the high likelihood $L_i$ is specifically performed as below.

The total number of search candidate points at time t is denoted by $S_t$. In addition, the ratio of the likelihood of the search candidate point i at time t to the sum $\phi_t$ of the likelihoods of all the search candidate points acquired in Step S206 is denoted by $\phi_{i,t}$. At the same position as the three-dimensional position of the candidate point i at t, $(\phi_{i,t}/\phi_t \times S_t)$ search candidate points of time t+1 are generated. In other words, for a search candidate point at time t that has a low likelihood, any search candidate point is not generated at time t+1, and accordingly, search candidate points having the low likelihood disappear at time t+1. On the other hand, although a search candidate point at time t that has a high likelihood is copied as a plurality of search candidate points, and it seems that the same positions are searched, however, as described above, in a case where the sample point data is received by the first setting unit 35, a plurality of the search candidate points included therein are modified respectively so as to be search candidate points located at different positions. Accordingly, as the likelihood of a search candidate point at time t is higher, a search candidate point of time t+1 is set to be more adjacent thereto.

For example, it is assumed that the total number of search candidate points at time t is 100, and the sum of the likelihoods is 1. When the likelihood of the search candidate point i at time t is 0.5, the likelihood ratio $\phi_{\omega}$ is 0.5. In other words, at the same position as that of the search candidate point i, 50 search candidate points are generated at time t+1. For a search candidate point having likelihood of 0.01, one search candidate point is generated at the same position at time t+1. On the other hand, search candidate points having the likelihood lower than 0.01 disappear.

Next, the estimating unit 37 performs an output process in Step S216 and ends this routine. In Step S216, the estimating unit 37 outputs the sample point data that includes the search candidate points set in Step S214 and the three-dimensional position of the target object and the size of the target object that have been calculated in Step S210 to the switching unit 39. In addition, the estimating unit 37 outputs the three-dimensional position of the target object and the size of the target object, which have been calculated in Step S210, to the display device 14.

The output destination of the three-dimensional position of the target object and the size of the target object in Step S216 is not limited to the display device 14. For example, the image processing device 12A is configured to be connected to various external devices through a wired network or a wireless network. As the various external devices, for example, there are known a storage medium, a personal computer, a mobile terminal, and the like. Then, the estimating unit 37 may output the three-dimensional position of the target object and the size of the target object calculated in Step S210 to these various external devices.

As described above, in the image processing device 12A of this embodiment, the three-dimensional position and the size of the target object that have been previously calculated are used as the provisional three-dimensional position and the provisional size at the time of calculating the three-dimensional position and the size of the target object next time.

Accordingly, the processing time of the image processing device 12A can be shorter than that of a case where, after the process of the first acquiring unit 30, the second acquiring unit 32, and the first setting unit 35 are completed, the three-dimensional position of the target object and the size of the target object are calculated by the estimating unit 37 based on the captured image acquired from the first acquiring unit 30 and the provisional size and the provisional three-dimensional position acquired from the first setting unit 35.

Described in detail, in a case where the processing time of the first acquiring unit 30 and the processing time of the second acquiring unit 32 and the first setting unit 35 are different from each other, it is necessary to perform the process by using the estimating unit 37 after waiting for the completion of the slow process in the above-described case. Particularly, in the second acquiring unit 32, for example, in a case where a search method using a stereo camera is performed, it is necessary to determine whether or not a target object exists at each scanning position within the captured image by scanning search windows having a plurality of sizes for the whole captured image. Accordingly, a time interval until the provisional three-dimensional position and the provisional size of the target object are acquired is lengthened. On the other hand, the process of the first acquiring unit 30 is only a process of acquiring the captured image from the imaging device 16, and accordingly, the processing time thereof is shorter than that of the second acquiring unit 32.

On the other hand, in this embodiment, since the three-dimensional position and the size of the target object that have been previously calculated are used as the provisional three-dimensional position and the provisional size at the time of calculating the three-dimensional position and the size of the target object next time, the processing time of the image processing device 12A can be shortened.

Third Embodiment

In this embodiment, an embodiment will be described in which the vision of the displaying unit 21 is adjusted based on the three dimensional position and the size of the target object that have been calculated by the image processing device 12 or the image processing device 12A.

Here, the vision represents a range in which a viewer can observe a stereoscopic image displayed on the displaying unit 21 of the display device 14. This observable range is a range in a real space. This vision is determined based on the combination of display parameters of the displaying unit 21. Accordingly, the vision can be set by setting the display parameters of the displaying unit 21.

FIGS. 13 to 16D are schematic diagrams illustrating the control of the set position and the set range of a vision 80 through the adjustment of the display parameters of the displaying unit 21.

FIGS. 13 to 16D illustrate the relation between the display panel 20 and the light beam controlling unit 22 of the displaying unit 21 and the vision 80. In FIGS. 13 to 16D, a part of each element image 24 is appropriately enlarged.

As illustrated in FIG. 13, as the display parameters, there are a relative position between the display panel 20 and the light beam controlling unit 22, a distance between the display panel 20 and the light beam controlling unit 22, the angle of the displaying unit 21, the deformation of the displaying unit 21, the pixel pitch of the display panel 20, and the like.

The relative position between the display panel 20 and the light beam controlling unit 22 represents the position of a corresponding element image 24 that faces the center of the optical opening portion of the light beam controlling unit 22. The distance between the display panel 20 and the light beam controlling unit 22 represents a shortest distance between the opening portion of the light beam controlling unit 22 and an element image 24 corresponding thereto. The angle of the displaying unit 21 represents a rotation angle with respect to a reference position set in advance when the displaying unit 21 is rotated in the vertical direction at its rotary axis. The deformation of the displaying unit 21 represents the occurrence of the deformation of the main body of the displaying unit 21. The pixel pitch of the display panel 20 represents an interval between the pixels of each element image 24 of the display panel 20. Through a combination of the display parameters, an area in which the vision 80 is set in the real space is uniquely determined.

First, with reference to FIG. 13, a case will be described in which the position at which the vision 80 is set and the like are controlled by adjusting the distance between the display panel 20 and the light beam controlling unit 22 and the relative position between the display panel 20 and the light beam controlling unit 22.

FIG. 13 illustrates the basic positional relation 1300(A) between the displaying unit 21 and the vision 80. A positional relation 1300(B) illustrates a case where the distance between the display panel 20 and the light beam controlling unit 22 is set to be shorter than that of 130013(A).

As illustrated in positional relations 1300(A) and, as the distance between the display panel 20 and the light beam controlling unit 22 is set to be shorter, the vision 80 can be set to a position closer to the displaying unit 21 (see vision 80A and vision 80B illustrated in FIG. 13. In contrast to this, as the distance between the display panel 20 and the light beam controlling unit 22 is set to be longer, the vision 80 can be set at a position farther from the displaying unit 21. In addition, as the vision 80 is set to a position closer to the displaying unit 21, the density of the light beam decreases.

Positional relation 1300(C) in FIG. 13 represents a case where the relative position of the display panel 20 with respect to the light beam controlling unit 22 is moved to the right side (see the direction of arrow R in positional relation 1300(C)) from that illustrated in positional relation 1300(A). As illustrated in positional relations 1300(A) and 1300(C), when the display panel 20 is relatively moved to the right side with respect to the light beam controlling unit 22, the vision 80 is moved (see a vision 80C illustrated in FIG. 13) to the left side (the direction of arrow L illustrated in positional relation 1300(C)). In contrast to this, when the relative position of the display panel 20 with respect to the light beam controlling unit 22 is moved to the left side from that illustrated in positional relation 1300(A), the vision 80 is moved to the right side (not illustrated in the figure).

Next, with reference to FIGS. 14 and 15, a case will be described in which the position at which the vision 80 is set and the like are controlled by adjusting the pitch of pitches (pixel alignment) displayed on the display panel 20.

Figure 14:
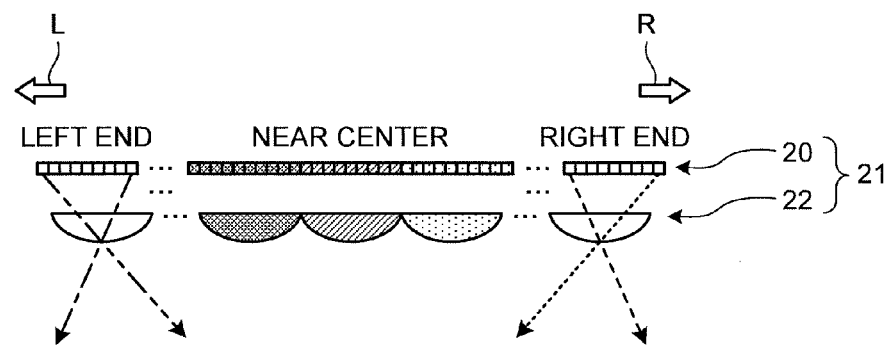
FIG. 14 is a diagram illustrating control on a set position and a set range of a vision according to the third embodiment.
Figure 15:
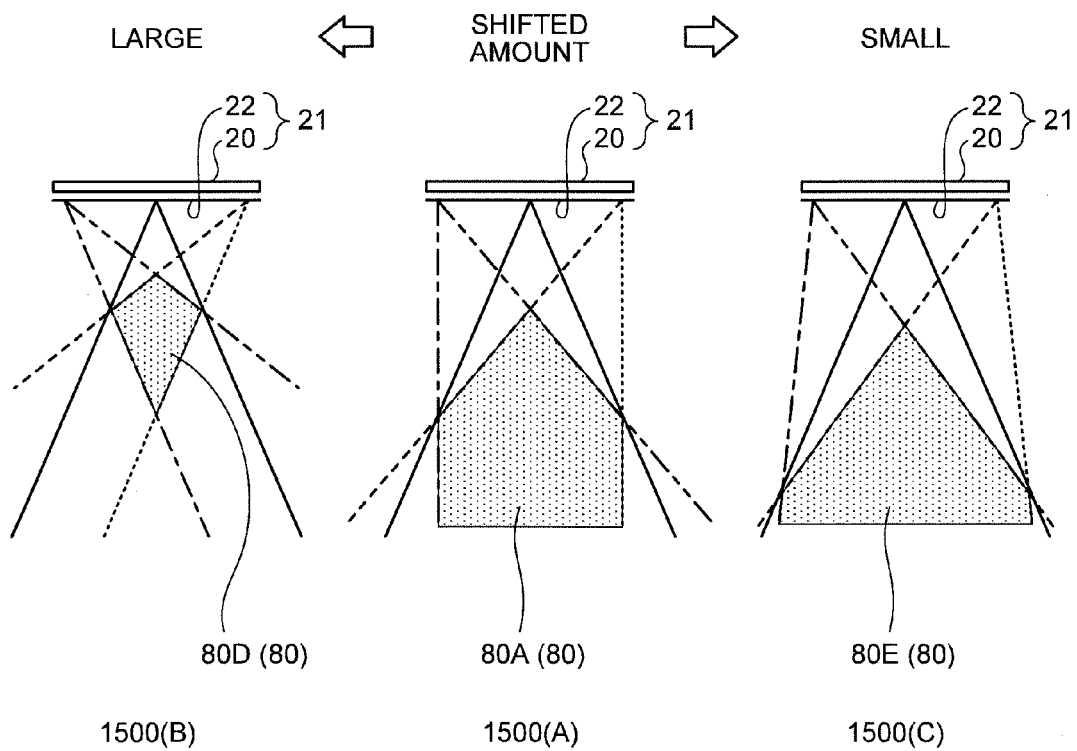
FIG. 15 is a diagram illustrating control on a set position and a set range of a vision according to the third embodiment.

FIG. 14 illustrates each pixel of the display panel 20 and the light beam controlling unit 22 of the displaying unit 21 in an enlarged scale. Positional relation 1500(A) illustrates the basic positional relation between the displaying unit 21 and the vision 80 (vision 80A). The position of each pixel of the display panel 20 and the position of the light beam controlling unit 22 are relatively shifted by an amount corresponding to an end (right end (an end portion in the direction of arrow R in FIG. 14) and a left end (an end portion in the direction of arrow L in FIG. 14) of the screen of the display panel 20. Then, the vision 80 is moved to a position closer to the displaying unit 21, and the width of the vision 80 is further narrowed (see a vision 80D illustrated in positional relation 1500(B)). Here, the width of the vision 80 represents the maximum length of each vision 80 in the horizontal direction. The width of the vision 80 may be called a vision setting distance.

On the other hand, the amount of relative shift between the position of each pixel of the display panel 20 and the position of the light beam controlling unit 22 is decreased by the amount corresponding to the end of the screen of the display panel 20. Then, the vision 80 is moved to a position farther from the displaying unit 21, and the width of the vision 80 is further widened (see a vision 80E illustrated in positional relation 1500(C)).

Next, with reference to FIGS. 16A to 16D, a case will be described in which the set position of the vision 80 and the like are controlled by adjusting the angle of the displaying unit 21, the deformation of the displaying unit 21, and the relative position between the display panel 20 and the light beam controlling unit 22.

Figure 16A:
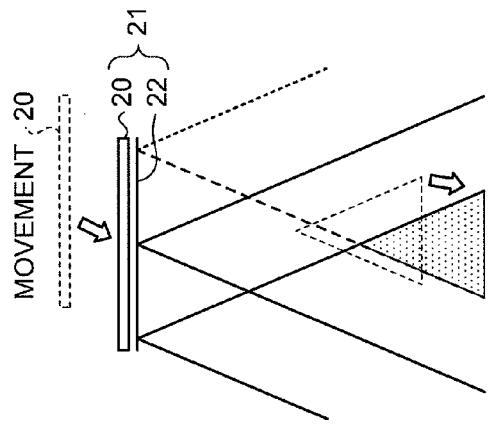
FIGS. 16A to 16D are diagrams illustrating control on a set position and a set range of a vision according to the third embodiment.
Figure 16B:
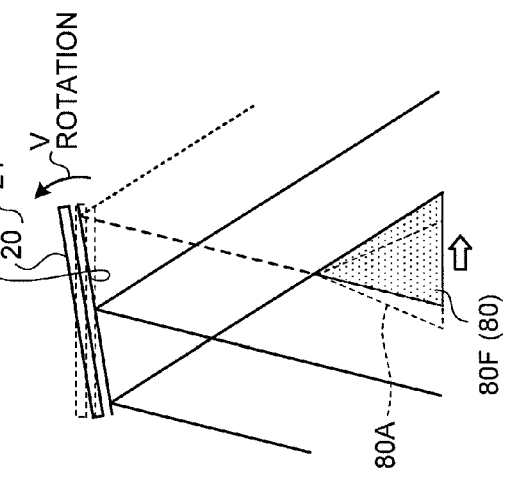

FIG. 16A illustrates the basic positional relation between the displaying unit 21 and the vision 80 (vision 80A). FIG. 16B illustrates a state in which the displaying unit 21 is rotated (in the direction of arrow V in FIG. 16B). As illustrated in FIGS. 16A and 16B, when the angle of the displaying unit 21 is adjusted by rotating the displaying unit 21, the position of the vision 80 is moved from a vision 80A to a vision 80F.

Figure 16C:
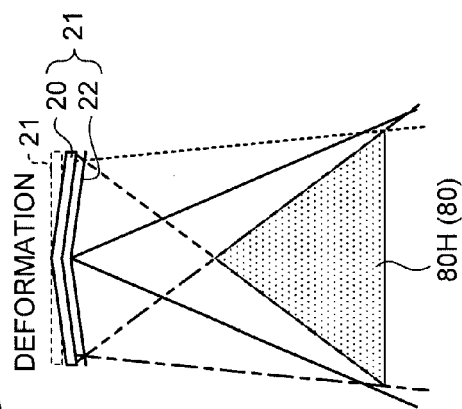

FIG. 16C illustrates a state in which the position and the direction of the display panel 20 with respect to the light beam controlling unit 22 are adjusted. As illustrated in FIG. 16C, when the position and the direction of the display panel 20 with respect to the light beam controlling unit 22 are changed, the vision 80 is moved from the vision 80A to a vision 80G.

Figure 16D:
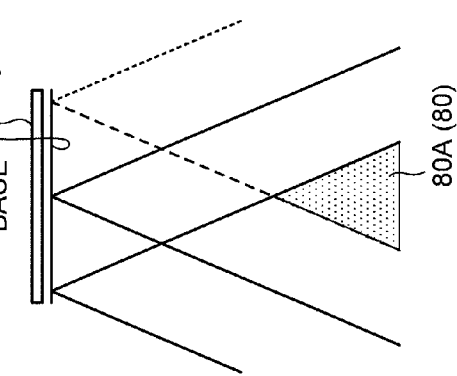

FIG. 16D illustrates at state in which the entire displaying unit 21 is deformed. As illustrated in FIGS. 16A and 16D, by deforming the displaying unit 21, the vision 80 is changed from the vision 80A to a vision 80H.

As described above, according to the combination of the display parameters of the displaying unit 21, the area (the position, the size, and the like) in which the vision 80 is set in the real space is uniquely determined.

Next, the functional configuration of the image display apparatus 10 will be described.

Figure 17:
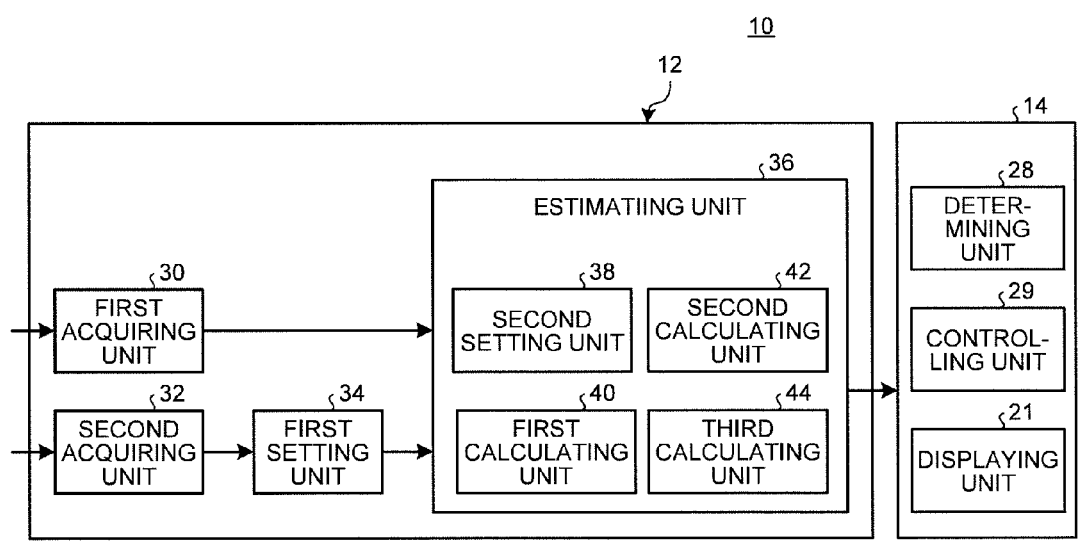
FIG. 17 is a diagram of an image display apparatus according to the third embodiment.

FIG. 17 is a block diagram illustrating the functional configuration of an image display apparatus 10. The image display apparatus 10 includes an image processing device 12 and a display device 14. Since the configuration of the image processing device 12 has been described in the above-described first embodiment, detailed description thereof will not be repeated.

The display device 14 includes a determining unit 28, a controlling unit 29, and a displaying unit 21. Since the displaying unit 21 has been described in the first embodiment, detailed description thereof will not be repeated.

The determining unit 28 receives the three-dimensional position of a target object and the size of the target object from the image processing device 12. Here, the determining unit 28 may receive at least the three-dimensional position of the target object from the image processing device 12. The determining unit 28 calculates vision information that represents a vision in which a stereoscopic image can be observed at the received three-dimensional position. In the calculation of the vision information, for example, the vision information that represents visions corresponding to combinations of the display parameters is stored in a memory (not illustrated in the figure) in advance. Then, the determining unit 28 calculates the vision information by searching the memory for the vision information in which the three-dimensional position received from the image processing device 12 is included in the vision.

In addition, the determining unit 28 may calculate the vision information by calculating an area, in which the three-dimensional position acquired from the image processing device 12 is included, corresponding to the size of the target object that is acquired from the image processing device 12 and searching the memory for the vision information of a vision including the area.

The controlling unit 29 performs a display control process by controlling the displaying unit 21 such that a vision corresponding to the vision information calculated by the determining unit 28 is calculated. In other words, the controlling unit 29 sets the vision by adjusting the display parameters of the displaying unit 21. Described in detail, in the displaying unit 21, a driving unit, which is not illustrated in the figure, used for adjusting each display parameter is disposed. In addition, the controlling unit 29 stores the vision information representing visions corresponding to combinations of the display parameters in a memory (not illustrated in the figure) in advance. Then, the controlling unit 29 reads out the combination of the display parameters corresponding to the vision information calculated by the determining unit 28 from the memory and controls the driving unit in correspondence with the read display parameters.

Accordingly, the displaying unit 21 displays a stereoscopic image of which the vision is set to an area including the three-dimensional position of the target object that has been received from the image processing device 12.

As described above, the three-dimensional position of a target object that is calculated by the image processing device 12 is a three-dimensional position that specifies the target object with high accuracy. Accordingly, the display device 14 can set the vision at the three-dimensional position of the target object with high accuracy. In addition, since it is unnecessary for a viewer to move so as to be located within a vision, the convenience is improved.

In addition, in this embodiment, although a case has been described in which the display device 14 is configured to include the determining unit 28 and the controlling unit 29, the image processing device 12 may be configured to include the determining unit 28 and the controlling unit 29.

Furthermore, in this embodiment, although a case has been described in which the image display apparatus 10 is configured to include the image processing device 12 and the display device 14, the image display apparatus may be configured to include the image processing device 12A described in the second embodiment instead of the image processing device 12.

In addition, programs used for performing the acquiring process and the calculating process performed by the image processing device 12 and the image processing device 12A according to the first to third embodiments and the display controlling process performed by the display device 14 are provided with being built in a read only memory (ROM) or the like in advance.

The programs used for performing the acquiring process and the calculating process performed by the image processing device 12 and the image processing device 12A according to the first to third embodiments and the display controlling process performed by the display device 14 may be configured so as to be provided by recording them on a computer-readable recording medium such as a CD-ROM, a flexible disk (FD), a CD-R, or a digital versatile disk (DVD) as a file having an installable format or an executable format.

In addition, the programs used for performing the acquiring process and the calculating process performed by the image processing device 12 and the image processing device 12A according to the first to third embodiments and the display controlling process performed by the display device 14 may be configured so as to be provided by storing them on a computer connected to a network such as the Internet and downloading them through the network. Furthermore, the programs used for performing the acquiring process and the calculating process performed by the image processing device 12 and the image processing device 12A according to the first to third embodiments and the display controlling process performed by the display device 14 may be configured to be provided or distributed through a network such as the Internet.

The programs used for performing the acquiring process and the calculating process performed by the image processing device 12 and the image processing device 12A according to the first to third embodiments and the display controlling process performed by the display device 14 are configured as modules including the above-described units (the first acquiring unit 30, the second acquiring unit 32, the first setting unit 34, the first setting unit 35, the estimating unit 36, the estimating unit 37, the second setting unit 38, the switching unit 39, the second calculating unit 42, the first calculating unit 40, and the third calculating unit 44), and, as actual hardware, as actual hardware, the CPU (processor) reads out the programs from the ROM and executes the programs, whereby the above-described units are loaded into a main memory device so as to generate the functional units in the main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
   a first acquiring unit configured to acquire a plurality of captured images by imaging a target object from a plurality of positions;
   a second acquiring unit configured to acquire a provisional three-dimensional position of the target object from the plurality of the captured images and acquire a provisional size of the target object included in the plurality of the captured images, wherein the second acquiring unit uses search windows having a plurality of search window sizes that are different from one another, scans each captured image, and acquires the provisional size of the target object included in a scanned captured image;
   a first setting unit configured to set at least one search candidate point in a vicinity of the provisional three-dimensional position in a real space;
   a second setting unit configured to set search windows used to search the target object, the search windows corresponding to each projection position at which the search candidate point is projected on each captured image, the search windows having a size that is based on the position of the search candidate point and the provisional size;
   a first calculating unit configured to calculate evaluation values representing whether or not the target object is included inside the search windows; and
   a second calculating unit configured to calculate a three-dimensional position of the target object by using at least one search candidate point based on the evaluation values.

2. The image processing device according to claim 1, wherein
   the second setting unit newly calculates one or a plurality of provisional sizes of the target object based on the provisional size and sets a search window size for each projection position based on the newly-calculated provisional size and the projection position.

3. The image processing device according to claim 2, wherein
   the first calculating unit calculates a first likelihood representing whether or not the target object is included inside a search window, as an evaluation value, based on pixel values inside the search window having the search window size on each captured image.

4. The image processing device according to claim 3, wherein
   the first setting unit sets the three-dimensional position as the provisional three-dimensional position.

5. The image processing device according to claim 1, wherein
   the first calculating unit calculates the evaluation values based on a predetermined posture of the target object.

6. The image processing device according to claim 1, wherein
   the first setting unit sets the search candidate point in accordance with a kinetic model, which is set in advance, of the target object.

7. The image processing device according to claim 1, further comprising:
   a third calculating unit configured to calculate a second likelihood representing a probability that the target object exists at the search candidate point corresponding to the projection position,
   wherein the second calculating unit calculates the three-dimensional position based on the second likelihood.

8. The image processing device according to claim 1, further comprising:
   a determining unit configured to determine a vision in which a viewer is able to observe a stereoscopic image displayed on a displaying unit as the three dimensional position; and
   a controlling unit configured to control the displaying unit so as to set the vision.

9. A method of processing an image, the method comprising:
   acquiring a plurality of captured images by imaging a target object from a plurality of positions;

acquiring a provisional three-dimensional position of the target object from the plurality of the captured images and acquiring a provisional size of the target object included in the plurality of the captured images, wherein acquiring the provisional size includes using search windows having a plurality of search window sizes that are different from one another, scanning each captured image, and acquiring the provisional size of the target object include in a scanned captured image;

setting at least one search candidate point in a vicinity of the provisional three-dimensional position in a real space;

setting search windows used to search the target object, the search windows corresponding to each projection position at which the search candidate point is projected on each captured image, the search windows having a size that is based on the position of the search candidate point and the provisional size;

calculating evaluation values representing whether or not the target object is included inside the search windows; and calculating a three-dimensional position of the target object by using at least one search candidate point based on the evaluation values.

10. An image display apparatus comprising:

a first acquiring unit configured to acquire a plurality of captured images by imaging a target object from a plurality of positions;

a second acquiring unit configured to acquire a provisional three-dimensional position of the target object from the plurality of the captured images and acquire a provision& size of the target object included in the plurality of the captured images, wherein the second acquiring unit uses search windows having a plurality of search window sizes that are different from one another, scans each captured image, and acquires the provisional size of the target object included in a scanned captured image;

a first setting unit configured to set at least one search candidate point in a vicinity of the provisional three-dimensional position in a real space;

a second setting unit configured to set search windows used to search the target object, the search windows corresponding to each projection position at which the search candidate point is projected on each captured image, the search windows having a size that is based on the position of the search candidate point and the provisional size;

a first calculating unit configured to calculate evaluation values representing whether or not the target object is included inside the search windows;

a second calculating unit configured to calculate a three-dimensional position of the target object by using at least one search candidate point based on the evaluation values;

a displaying unit configured to display a stereoscopic image;

a determining unit configured to determine a vision in which a viewer can observe a stereoscopic image as the three-dimensional position; and a controlling unit configured to control the displaying unit so as to set the vision.

11. An image processing device comprising:

a first acquiring unit configured to acquire a plurality of captured images by imaging a target object from a plurality of positions;

a second acquiring unit configured to acquire a provisional three-dimensional position of the target object from the plurality of the captured images and acquire a provisional size of the target object included in the plurality of the captured images, wherein the second acquiring unit uses search windows having a plurality of search window sizes that are different from one another, scans each captured image, and acquires, as the provisional size of the target object, a search window size having a highest likelihood representing a probability of existence of the target object;

a first setting unit configured to set at least one search candidate point in a vicinity of the provisional three-dimensional position in a real space;

a second setting unit configured to set search windows used to search the target object, the search windows corresponding to each projection position at which the search candidate point is projected on each captured image, the search windows having a size that is based on the position of the search candidate point and the provisional size;

a first calculating unit configured to calculate evaluation values representing whether or not the target object is included inside the search windows; and a second calculating unit configured to calculate a three-dimensional position of the target object by using at least one search candidate point based on the evaluation values.

* * * * *